(12) United States Patent
Shao et al.

(10) Patent No.: US 12,010,527 B2
(45) Date of Patent: Jun. 11, 2024

(54) BEAM INDICATION METHOD AND APPARATUS

(71) Applicant: Huawei Technologies Co., Ltd., Shenzhen (CN)

(72) Inventors: Hua Shao, Shenzhen (CN); Ziming Yu, Chengdu (CN); Huang Huang, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 507 days.

(21) Appl. No.: 17/207,012

(22) Filed: Mar. 19, 2021

(65) Prior Publication Data

US 2021/0211893 A1   Jul. 8, 2021

Related U.S. Application Data

(63) Continuation of application No. PCT/CN2019/105950, filed on Sep. 16, 2019.

(30) Foreign Application Priority Data

Sep. 20, 2018   (CN) .......................... 201811099017.1

(51) Int. Cl.
*H04W 4/00* (2018.01)
*H04B 7/08* (2006.01)
(Continued)

(52) U.S. Cl.
CPC ............ *H04W 16/28* (2013.01); *H04B 7/088* (2013.01); *H04W 72/046* (2013.01); *H04W 72/23* (2023.01); *H04W 72/53* (2023.01)

(58) Field of Classification Search
CPC ... H04W 16/28; H04W 72/046; H04W 72/23; H04W 72/53; H04B 7/088; H04B 7/0621;
(Continued)

(56) References Cited

U.S. PATENT DOCUMENTS 11,184,895 B2   11/2021   Tang
11,483,721 B1 *  10/2022   Enescu ................. H04L 5/0051
(Continued)

FOREIGN PATENT DOCUMENTS

CN   107888243 A   4/2018
CN   108023708 A   5/2018
(Continued)

OTHER PUBLICATIONS

"3rd Generation Partnership Project; Technical Specification Group Radio Access Network; NR; Radio Resource Control (RRC) protocol specification (Release 15)," 3GPP TS 38.331 V15.2.1, Jun. 2018, 303 pages.
(Continued)

*Primary Examiner* — Stephen M D Agosta
(74) *Attorney, Agent, or Firm* — SLATER MATSIL, LLP

(57) ABSTRACT

A beam indication device and method, the method including receiving first information from a network device, where the first information is used to determine at least one of a first receive beam for a downlink signal or a first transmit beam for an uplink signal, and determining the at least one of the first receive beam for the downlink signal or the first transmit beam for the uplink signal based on the first information.

6 Claims, 6 Drawing Sheets

(51) Int. Cl.
  *H04W 16/28* (2009.01)
  *H04W 72/044* (2023.01)
  *H04W 72/23* (2023.01)
  *H04W 72/53* (2023.01)
(58) Field of Classification Search
  CPC .... H04B 7/0628; H04B 7/0695; H04B 7/086; H04L 5/0025; H04L 5/0048; H04L 5/0094; H04L 5/0053
  See application file for complete search history.

(56) References Cited

U.S. PATENT DOCUMENTS

| | | | |
|---|---|---|---|
| 11,671,197 B2 * | 6/2023 | Wang | H04L 27/2607 370/329 |
| 11,863,282 B2 * | 1/2024 | Noh | H04W 72/51 |
| 11,930,469 B2 * | 3/2024 | Zhang | H04W 24/10 |
| 2013/0286960 A1 * | 10/2013 | Li | H04B 7/0684 370/329 |
| 2013/0301567 A1 * | 11/2013 | Jeong | H04B 7/0695 370/329 |
| 2014/0065950 A1 | 3/2014 | Mendelsohn et al. | |
| 2015/0016361 A1 * | 1/2015 | Kim | H04L 1/0041 370/329 |
| 2015/0180625 A1 | 6/2015 | Park et al. | |
| 2016/0197659 A1 * | 7/2016 | Yu | H04B 7/0617 370/335 |
| 2017/0033854 A1 * | 2/2017 | Yoo | H04W 24/10 |
| 2018/0048442 A1 * | 2/2018 | Sang | H04W 72/046 |
| 2018/0102826 A1 * | 4/2018 | Raghavan | H04B 7/0695 |
| 2018/0146460 A1 * | 5/2018 | Lee | H04L 5/0053 |
| 2018/0205440 A1 | 7/2018 | Enescu et al. | |
| 2018/0242300 A1 | 8/2018 | Hakola et al. | |
| 2018/0249526 A1 * | 8/2018 | Nagaraja | H04W 24/08 |
| 2018/0255607 A1 * | 9/2018 | Nagaraja | H04L 5/0053 |
| 2018/0262242 A1 | 9/2018 | Chakraborty et al. | |
| 2018/0262993 A1 * | 9/2018 | Akkarakaran | H04W 52/42 |
| 2018/0263024 A1 * | 9/2018 | John Wilson | H04W 72/23 |
| 2019/0028174 A1 * | 1/2019 | Chakraborty | H04B 7/0408 |
| 2019/0075526 A1 * | 3/2019 | Nagaraj | H04B 7/0408 |
| 2019/0199406 A1 | 6/2019 | Wang et al. | |
| 2019/0215828 A1 * | 7/2019 | Kim | H04W 72/04 |
| 2019/0253108 A1 * | 8/2019 | Zhang | H04B 7/0695 |
| 2019/0373592 A1 | 12/2019 | Ji et al. | |
| 2019/0394762 A1 * | 12/2019 | Tang | H04W 74/0833 |
| 2020/0014442 A1 | 1/2020 | Tang | |
| 2020/0145079 A1 * | 5/2020 | Marinier | H04W 56/0045 |
| 2021/0067224 A1 * | 3/2021 | Yuan | H04B 7/0639 |
| 2021/0320710 A1 * | 10/2021 | Koskela | H04W 24/08 |
| 2022/0060221 A1 * | 2/2022 | Ko | H04B 7/088 |
| 2022/0322310 A1 * | 10/2022 | Laddu | H04L 1/1812 |
| 2022/0361160 A1 * | 11/2022 | Bai | H04W 72/23 |
| 2023/0090518 A1 * | 3/2023 | Yang | H04B 7/088 375/267 |
| 2023/0156504 A1 * | 5/2023 | Raghavan | H04W 24/10 370/252 |
| 2023/0188197 A1 * | 6/2023 | Zhang | H04B 7/0634 370/329 |
| 2023/0254030 A1 * | 8/2023 | Fan | H04W 72/23 |
| 2024/0031887 A1 * | 1/2024 | Lou | H04W 36/085 |

FOREIGN PATENT DOCUMENTS

| | | |
|---|---|---|
| CN | 108023841 A | 5/2018 |
| CN | 108024346 A | 5/2018 |
| CN | 108282198 A | 7/2018 |
| WO | 2018085709 A1 | 5/2018 |
| WO | 2018113593 A1 | 6/2018 |
| WO | 2018120099 A1 | 7/2018 |
| WO | 2018126412 A1 | 7/2018 |
| WO | 2018127181 A1 | 7/2018 |

OTHER PUBLICATIONS

"3rd Generation Partnership Project; Technical Specification Group Radio Access Network; NR; Physical layer procedures for data (Release 15)," 3GPP TS 38.214 V15.2.0, Jun. 2018, 95 pages.

"Corrections on Beam Reporting and Indication," Agenda item: 7.1.2.2.3, Source: Samsung, Document for: Discussion and Decision, 3GPP TSG RAN WG1 Meeting #92bis, R1-1804358, Sanya, China, Apr. 16-20, 2018, 8 pages.

"On Signalling Reduction for Beam Management," Agenda Item: 7.2.8, Source: Ericsson, Document for: Discussion, 3GPP TSG-RAN WG1 Meeting #94, Tdoc R1-1809214, Gothenburg, Sweden, Aug. 20-24, 2018, 3 pages.

"Details for UL Beam Management," Source: Intel Corporation, Agenda Item: 5.1.2.2.1, Document for: Discussion and Decision, 3GPP TSG-RAN WG1 NR AdHoc #2, R1-1710525, Jun. 27-30, 2017, 9 pages.

"Measurement reporting and beam refinement during RACH," Agenda item: 10.2.12, Source: Qualcomm Incorporated,WID/SID: NR_newRAT-Core, Release 15, Document for: Discussion and Decision, 3GPP TSG-RAN WG2 Meeting #99bis, R2-1711350 (Resubmission of R2-1709088), Prague, Czech, Oct. 9-13, 2017, 6 pages.

"Remaining issues on beam measurement and reporting," Agenda Item: 7.1.2.2.3, Source: Ericsson, Document for: Discussion, Decision, 3GPP TSG-RAN WG1 Meeting #93, Tdoc R1-1806217, Busan, Korea, May 21-25, 2018, 13 pages.

"QCL Indication of Downlink Control Channel and Beam Management Reference Signals," Agenda Item: 5.1.2.2, Source: Huawei, HiSilicon, Document for: Discussion and decision, 3GPP TSG RAN WG1 NR Ad Hoc Meeting, R1-1700405, Spokane, USA, Jan. 16-20, 2017, 4 pages.

* cited by examiner

BEAM INDICATION METHOD AND APPARATUS

CROSS-REFERENCE TO RELATED APPLICATIONS

This application is a continuation of International Application No. PCT/CN2019/105950, filed on Sep. 16, 2019, which claims priority to Chinese Patent Application No. 201811099017.1, filed on Sep. 20, 2018. The disclosures of the aforementioned applications are hereby incorporated by reference in their entireties.

TECHNICAL FIELD

This application relates to the field of wireless communications technologies, and in particular, to a beam indication method and an apparatus.

BACKGROUND

In a long term evolution (LTE) communications system, receiving a downlink signal by a terminal device and sending an uplink signal by the terminal device are both scheduled based on a base station. Generally, the downlink signal and the uplink signal are independently scheduled based on respective physical downlink control channels (PDCCH). In other words, a network device schedules the receiving of the downlink signal through one PDCCH, and then schedules the sending of the uplink signal through another PDCCH.

However, in some scenarios in which centralized control is required, the receiving of the downlink signal and the sending of the uplink signal usually occur in pairs. For example, a controller sends an instruction to the terminal device, and the instruction may be used to request to obtain data from the terminal device, or is used to control the terminal device to execute some operations and/or commands. After the terminal device receives the instruction, if the instruction is to request to obtain the data, the terminal device returns, to the controller, the data that the network device requests to obtain. If the instruction is used to control the terminal device to execute some operations and/or commands, the terminal device returns an execution result to the controller after executing the operations and/or commands. However, the sending of the uplink signal and the receiving of the downlink signal are scheduled separately and independently, thereby leading to relatively high scheduling overheads.

SUMMARY

This application provides a beam indication method and an apparatus, to reduce scheduling overheads for receiving a downlink signal and sending an uplink signal.

According to a first aspect, this application provides a beam indication method. The method includes receiving first information from a network device, where the first information is used to determine a first receive beam for a downlink signal and/or a first transmit beam for an uplink signal, and determining the first receive beam for the downlink signal and/or the first transmit beam for the uplink signal based on the first information.

In the technical solution provided in this application, the network device sends the first information to a terminal device, so that the terminal device determines the first receive beam for the downlink signal and the first transmit beam for the uplink signal based on the first information. In this way, receiving the downlink signal by the terminal device and sending the uplink signal by the terminal device may be scheduled in pairs, and scheduling overheads for receiving the downlink signal and sending the uplink signal may be reduced.

It should be noted that the first information may be broadcast information sent by the network device. After different terminal devices receive the first information, the first information may be used to determine the first receive beam, or to determine the first transmit beam, or to determine both the first receive beam and the first transmit beam.

When the terminal device determines only the first receive beam, a possibility is that the terminal device receives only the downlink signal, and another possibility is that transmission of the uplink and downlink signals is included. In the latter case, the terminal device may use, as the first transmit beam, a beam same as the first receive beam.

When the terminal device determines only the first transmit beam, a possibility is that the terminal device sends only the uplink signal, and another possibility is that transmission of the uplink and downlink signals is included. In the latter case, the downlink signal may be received by using, as the first receive beam, a beam same as the beam for sending the uplink signal.

With reference to the first aspect, in some implementations of the first aspect, the first information includes first reference signal configuration information and second reference signal configuration information, the first reference signal configuration information is used to indicate an identifier of a first downlink reference signal, the second reference signal configuration information is used to indicate an identifier of a second downlink reference signal, and the determining the first receive beam and/or the first transmit beam based on the first information includes determining the first downlink reference signal based on the first reference signal configuration information, and determining the first receive beam based on the first downlink reference signal, and/or determining the second downlink reference signal based on the second reference signal configuration information, and determining the first transmit beam based on the second downlink reference signal.

With reference to the first aspect, in some implementations of the first aspect, the first downlink reference signal or the second downlink reference signal includes any one of the following signals: a synchronization signal block, a channel state information-reference signal (CSI-RS), a physical downlink control channel (PDCCH) demodulation reference signal (DMRS), a physical downlink shared channel PDSCH demodulation reference signal (DMRS), and a phase tracking reference signal (PTRS).

With reference to the first aspect, in some implementations of the first aspect, the first information includes third reference signal configuration information and fourth reference signal configuration information, the third reference signal configuration information is used to indicate an identifier of a third downlink reference signal, the fourth reference signal configuration information is used to indicate an identifier of a first uplink reference signal, and the determining the first receive beam and/or the first transmit beam based on the first information includes determining the third downlink reference signal based on the third reference signal configuration information, and determining the first receive beam based on the third downlink reference signal, and/or determining the first uplink reference signal based on the fourth reference signal configuration information, and determining the first transmit beam based on the first uplink reference signal.

With reference to the first aspect, in some implementations of the first aspect, the third downlink reference signal includes any one of the following signals: a synchronization signal block, a channel state information-reference signal (CSI-RS), a physical downlink control channel (PDCCH) demodulation reference signal (DMRS), a physical downlink shared channel (PDSCH) demodulation reference signal (DMRS), and a phase tracking reference signal (PTRS), the first uplink reference signal includes any one of the following signals: a physical uplink control channel (PUCCH) demodulation reference signal (DMRS), a physical uplink shared channel (PDSCH) demodulation reference signal (DMRS), a sounding reference signal (SRS), and a physical random access channel (PRACH).

With reference to the first aspect, in some implementations of the first aspect, the first information is used to indicate an identifier of a fourth downlink reference signal, and the determining the first receive beam and/or the first transmit beam based on the first information includes determining the fourth downlink reference signal based on the first information, and determining the first receive beam and/or the first transmit beam based on the fourth downlink reference signal, or the first information is used to indicate an identifier of a second uplink reference signal, and the determining the first receive beam and/or the first transmit beam based on the first information includes determining the second uplink reference signal based on the first information, and determining the first transmit beam and/or the first receive beam based on the second uplink reference signal.

With reference to the first aspect, in some implementations of the first aspect, the fourth downlink reference signal includes any one of the following signals: a synchronization signal block, a channel state information-reference signal (CSI-RS), a physical downlink control channel (PDCCH) demodulation reference signal (DMRS), a physical downlink shared channel (PDSCH) demodulation reference signal (DMRS), and a phase tracking reference signal (PTRS), or the second uplink reference signal includes any one of the following signals: a physical uplink control channel (PUCCH) demodulation reference signal (DMRS), a physical uplink shared channel (PDSCH) demodulation reference signal (DMRS), a sounding reference signal (SRS), and a physical random access channel (PRACH).

With reference to the first aspect, in some implementations of the first aspect, the method further includes detecting that a beam failure occurs on the first receive beam, and performing uplink transmission with the network device by using a beam configured by the network device for rectifying the beam failure.

With reference to the first aspect, in some implementations of the first aspect, the method further includes receiving second information from the network device, where the second information is used to indicate a second receive beam for the downlink signal and/or a second transmit beam for the uplink signal, and receiving the downlink signal from the network device by using the second receive beam, and/or sending the uplink signal to the network device by using the second transmit beam.

With reference to the first aspect, in some implementations of the first aspect, a time interval between a first time for receiving the downlink signal and a second time for sending the uplink signal is greater than a preset threshold.

With reference to the first aspect, in some implementations of the first aspect, the method further includes the terminal device receives time interval indication information from the network device. The time interval indication information is used to indicate the time interval configured between the first time and the second time by the network device. When the time interval indicated by the time interval indication information is greater than or equal to the preset threshold, the terminal device switches from the first receive beam for the downlink signal to the first transmit beam for the uplink signal, or the terminal device switches from the second receive beam for the downlink signal to the second transmit beam for the uplink signal.

According to a second aspect, this application provides a beam indication method. The method includes receiving third information from a network device, where the third information is used to indicate a third receive beam for a downlink signal, determining the third receive beam based on the third information, receiving the downlink signal from the network device by using the third receive beam, where the downlink signal carries fourth information, and the fourth information is used to indicate a third transmit beam for an uplink signal, and determining the third transmit beam based on the fourth information.

With reference to the second aspect, in some implementations of the second aspect, the fourth information is used to indicate identifiers of a plurality of downlink reference signals, and the determining the third transmit beam based on the fourth information includes determining the third transmit beam based on one of the plurality of downlink reference signals indicated by the fourth information, or the fourth information is used to indicate identifiers of one or more uplink reference signals, and the determining the third transmit beam based on the fourth information includes determining the third transmit beam based on one of the plurality of uplink reference signals indicated by the fourth information.

With reference to the second aspect, in some implementations of the second aspect, the fourth information is used to indicate identifiers of a plurality of downlink reference signals, the third transmit beam includes a receive beam for the plurality of downlink reference signals, and the method further includes sending the uplink signal in turn by using the receive beam for the plurality of downlink reference signals, or the fourth information is used to indicate identifiers of a plurality of uplink reference signals, the third transmit beam includes a transmit beam for the plurality of uplink reference signals, and the method further includes sending the uplink signal in turn by using the transmit beam for the plurality of uplink reference signals.

With reference to the second aspect, in some implementations of the second aspect, the method further includes detecting that a beam failure occurs on the third receive beam for the downlink signal, and performing uplink transmission with the network device by using a beam configured by the network device for rectifying the beam failure.

With reference to the second aspect, in some implementations of the second aspect, the method further includes receiving fifth information from the network device, where the fifth information is used to indicate a fourth receive beam for the downlink signal and/or a fourth transmit beam for the uplink signal, and receiving the downlink signal from the network device by using the fourth receive beam, and/or sending the uplink signal to the network device by using the fourth transmit beam.

With reference to the second aspect, in some implementations of the second aspect, a time interval between a first time for receiving the downlink signal and a second time for sending the uplink signal is greater than a preset threshold.

With reference to the second aspect, in some implementations of the second aspect, the method further includes receiving time interval indication information from the network device, where the time interval indication information is used to indicate the time interval configured between the first time and the second time by the network device, and when the time interval indicated by the time interval indication information is greater than or equal to the preset threshold, switching, by the terminal device, from the third receive beam for the downlink signal to the third transmit beam for the uplink signal, or switching, by the terminal device, from the fourth receive beam for the downlink signal to the fourth transmit beam for the uplink signal.

According to a third aspect, this application provides a beam indication method. The method includes a network device generates first information, where the first information is used by a terminal device to determine a first receive beam for a downlink signal and/or a first transmit beam for an uplink signal. The network device sends the first information to the terminal device.

With reference to the third aspect, in some implementations of the third aspect, the first information includes first reference signal configuration information and second reference signal configuration information, the first reference signal configuration information is used to indicate an identifier of a first downlink reference signal, and the second reference signal configuration information is used to indicate an identifier of a second downlink reference signal.

With reference to the third aspect, in some implementations of the third aspect, the first downlink reference signal or the second downlink reference signal includes any one of the following signals: a synchronization signal block, a channel state information-reference signal (CSI-RS), a physical downlink control channel (PDCCH) demodulation reference signal (DMRS), a physical downlink shared channel (PDSCH) demodulation reference signal (DMRS), and a phase tracking reference signal (PTRS).

With reference to the third aspect, in some implementations of the third aspect, the first information includes third reference signal configuration information and fourth reference signal configuration information, the third reference signal configuration information is used to indicate an identifier of a third downlink reference signal, and the fourth reference signal configuration information is used to indicate an identifier of a first uplink reference signal.

With reference to the third aspect, in some implementations of the third aspect, the third downlink reference signal includes any one of the following signals: a synchronization signal block, a channel state information-reference signal (CSI-RS), a physical downlink control channel (PDCCH) demodulation reference signal (DMRS), a physical downlink shared channel (PDSCH) demodulation reference signal (DMRS), and a phase tracking reference signal (PTRS), the first uplink reference signal includes any one of the following signals: a physical uplink control channel (PUCCH) demodulation reference signal (DMRS), a physical uplink shared channel (PDSCH) demodulation reference signal (DMRS), a sounding reference signal SRS, and a physical random access channel (PRACH).

With reference to the third aspect, in some implementations of the third aspect, the first information is used to indicate an identifier of a fourth downlink reference signal, or the first information is used to indicate an identifier of a second uplink reference signal.

With reference to the third aspect, in some implementations of the third aspect, the fourth downlink reference signal includes any one of the following signals: a synchronization signal block, a channel state information-reference signal (CSI-RS), a physical downlink control channel (PDCCH) demodulation reference signal (DMRS), a physical downlink shared channel PDSCH demodulation reference signal (DMRS), and a phase tracking reference signal (PTRS), or the second uplink reference signal includes any one of the following signals: a physical uplink control channel (PUCCH) demodulation reference signal (DMRS), a physical uplink shared channel (PDSCH) demodulation reference signal (DMRS), a sounding reference signal (SRS), and a physical random access channel (PRACH).

With reference to the third aspect, in some implementations of the third aspect, the method further includes: A network device sends second information to the terminal device, where the second information is used to indicate a second receive beam for the downlink signal and a second transmit beam for the uplink signal.

With reference to the third aspect, in some implementations of the third aspect, the method further includes the network device sends time interval indication information to the terminal device. The time interval indication information is used to indicate a time interval configured by the network device between a first time for receiving the downlink signal by the terminal device and a second time for sending the uplink signal by the terminal device.

According to a fourth aspect, this application provides a beam indication method. The method includes a network device generates third information. The third information is used to indicate a third receive beam for a downlink signal. The network device sends the third information to a terminal device. The network device sends the downlink signal to the terminal device. The downlink signal carries the fourth information, and the fourth information is used to indicate a third transmit beam for an uplink signal.

With reference to the fourth aspect, in some implementations of the fourth aspect, the fourth information is used to indicate identifiers of a plurality of downlink reference signals, and the determining the third transmit beam for the uplink signal based on the fourth information includes determining the third transmit beam for the uplink signal based on one of the plurality of downlink reference signals indicated by the fourth information, or the fourth information is used to indicate identifiers of one or more uplink reference signals, and the determining the third transmit beam for the uplink signal based on the fourth information includes determining the third transmit beam for the uplink signal based on one of the plurality of uplink reference signals indicated by the fourth information.

With reference to the fourth aspect, in some implementations of the fourth aspect, the fourth information is used to indicate identifiers of a plurality of downlink reference signals, and the third transmit beam includes a receive beam for the plurality of downlink reference signals, or the fourth information is used to indicate identifiers of a plurality of uplink reference signals, and the third transmit beam includes a transmit beam for the plurality of uplink reference signals.

With reference to the fourth aspect, in some implementations of the fourth aspect, the fourth information is used to indicate identifiers of a plurality of downlink reference signals, and the third transmit beam includes a receive beam for the plurality of downlink reference signals, or the fourth information is used to indicate identifiers of a plurality of uplink reference signals, and the third transmit beam includes a transmit beam for the plurality of uplink reference signals.

With reference to the fourth aspect, in some implementations of the fourth aspect, the method further includes sending fifth information to the terminal device, where the fifth information is used to indicate a fourth receive beam for the downlink signal and/or a fourth transmit beam for the uplink signal.

With reference to the fourth aspect, in some implementations of the fourth aspect, the method further includes the network device sends time interval indication information to the terminal device. The time interval indication information is used to indicate a time interval configured by the network device between a first time for receiving the downlink signal by the terminal device and a second time for sending the uplink signal by the terminal device.

According to a fifth aspect, this application provides a communications apparatus. The communications apparatus has a function of implementing the terminal device in any one of the possible implementations of the first aspect or the second aspect. The function may be implemented by hardware or may be implemented by hardware executing corresponding software. The hardware or software includes one or more units corresponding to the functions.

According to a sixth aspect, this application provides a communications apparatus. The communications apparatus has a function of implementing the network device in any one of the possible implementations of the third aspect or the fourth aspect. The function may be implemented by hardware or may be implemented by hardware executing corresponding software. The hardware or software includes one or more units corresponding to the functions.

According to a seventh aspect, this application provides a terminal device, including a transceiver, a processor, and a memory. The processor is configured to control the transceiver to receive and send a signal. The memory is configured to store a computer program. The processor is configured to invoke and run the computer program stored in the memory, so that the terminal device performs the method in any one of the possible implementations of the first aspect or the second aspect.

According to an eighth aspect, this application provides a network device, including a transceiver, a processor, and a memory. The processor is configured to control the transceiver to receive and send a signal. The memory is configured to store a computer program. The processor is configured to invoke and run the computer program stored in the memory, so that the network device performs the method in any one of the possible implementations of the third aspect or the fourth aspect.

According to a ninth aspect, this application provides a computer readable storage medium, where the computer readable storage medium stores an instruction, and when the instruction is run on a computer, the computer is enabled to perform the method in any one of the possible implementations of the first aspect or the second aspect.

According to a tenth aspect, this application provides a computer readable storage medium, where the computer readable storage medium stores an instruction, and when the instruction is run on a computer, the computer is enabled to perform the method in any one of the possible implementations of the third aspect or the fourth aspect.

According to an eleventh aspect, this application provides a chip, including a processor. The processor is configured to read and execute a computer program stored in a memory, to perform the method in any one of the possible implementations of the first aspect or the second aspect. Optionally, the chip includes the memory, and the memory is connected to the processor through a circuit or a wire. Further, optionally, the chip further includes a communications interface, and the processor is connected to the communications interface. The communications interface is configured to receive data or information or both needing to be processed. The processor obtains the data or the information or both from the communications interface, processes the data or the information or both, and outputs a processing result through the communications interface. The communications interface may be an input/output interface.

According to a twelfth aspect, this application provides a chip, including a processor. The processor is configured to read and execute a computer program stored in a memory, to perform the method in any one of the possible implementations of the third aspect or the fourth aspect. Optionally, the chip includes the memory, and the memory is connected to the processor through a circuit or a wire. Further, optionally, the chip further includes a communications interface, and the processor is connected to the communications interface. The communications interface is configured to receive data or information or both needing to be processed. The processor obtains the data or the information or both from the communications interface, processes the data or the information or both, and outputs a processing result through the communications interface. The communications interface may be an input/output interface.

Optionally, the memory and the processor may be units that are physically independent of each other, or the memory may be integrated with the processor.

According to a thirteenth aspect, this application provides a computer program product, where the computer program product includes computer program code, and when the computer program code is run on a computer, the computer is enabled to perform the method in any one of the possible implementations of the first aspect or the second aspect.

According to a fourteenth aspect, this application provides a computer program product, where the computer program product includes computer program code, and when the computer program code is run on a computer, the computer is enabled to perform the method in any one of the possible implementations of the third aspect or the fourth aspect.

In the technical solutions provided in this application, the network device sends the first information to the terminal device, so that the terminal device determines the first receive beam for the downlink signal and the first transmit beam for the uplink signal based on the first information. In this way, receiving the downlink signal by the terminal device and sending the uplink signal by the terminal device may be scheduled in pairs, and scheduling overheads for receiving the downlink signal and sending the uplink signal may be reduced.

DETAILED DESCRIPTION OF ILLUSTRATIVE EMBODIMENTS

The following describes technical solutions of this application with reference to accompanying drawings.

Figure 1:
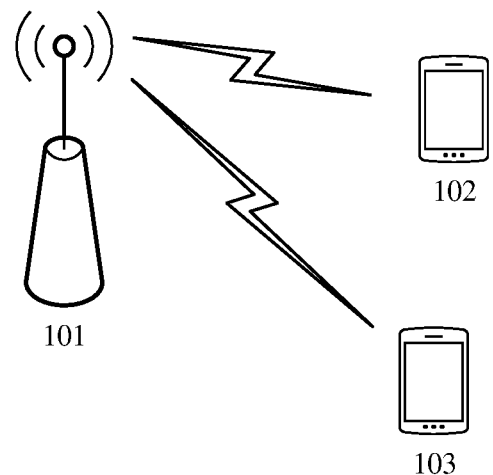
FIG. 1 is a schematic architectural diagram of a wireless communications system 100 to which an embodiment of this application is applicable.

FIG. 1 is a schematic diagram of a wireless communications system 100 to which an embodiment of this application is applicable. As shown in FIG. 1, the wireless communications system 100 may include at least one network device 101. The network device 101 wirelessly communicates with one or more terminal devices (for example, a terminal device 102 and a terminal device 103 that are shown in FIG. 1).

The wireless communications system 100 used in this application includes, but is not limited to, a global system for mobile communications (GSM), a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD), a universal mobile telecommunications system (UMTS), a worldwide interoperability for microwave access (WiMAX) communications system, three application scenarios of a next-generation mobile communications system (for example, 5G), that is, enhanced mobile broadband (eMBB), ultra reliable low latency communication (URLLC), and enhanced massive machine type communication (eMTC), a new communications system appearing in the future, or the like.

The terminal device in the embodiments of this application may also be referred to as user equipment (UE), a terminal, an access terminal, a subscriber unit, a subscriber station, a mobile station, a mobile console, a remote station, a remote terminal, a mobile device, a user terminal, a terminal, a wireless communications device, a user agent, a user apparatus, or the like. The terminal device may be a cellular phone, a cordless phone, a Session Initiation Protocol (SIP) phone, a wireless local loop (WLL) station, a personal digital assistant (PDA), a handheld device having a wireless communications function, a computing device, another processing device connected to a wireless modem, a vehicle-mounted device, a wearable device, a terminal device in a 5G network, or a terminal device in a future evolved public land mobile communications network (PLMN).

A network device used in the embodiments of this application may be a base transceiver station (BTS) in the global system for mobile communications (GSM) system or the code division multiple access (CDMA) system, or may be a NodeB (NB) in the wideband code division multiple access (WCDMA) system, or may be an evolved NodeB (eNodeB) in the LTE system, or may be a wireless controller in a cloud radio access network (CRAN) scenario. Alternatively, the network device may be a relay site, an access point, a vehicle-mounted device, a wearable device, or the like in a future communications system (for example, 5G).

The technical solutions provided in this application are applicable to a scenario in which the network device schedules an uplink signal and a downlink signal in pairs. The uplink signal is a signal sent by the terminal device to the network device, such as a physical uplink shared channel (PUSCH), a physical uplink control channel (PUCCH), or a physical random access channel (PRACH). The downlink signal is a signal sent by the network device to the terminal device, such as a physical downlink shared channel (PDSCH), a physical broadcast channel (PBCH), or a physical downlink control channel (PDCCH).

To facilitate understanding of the embodiments of this application, several basic concepts are first described.

In new radio (NR), a beam (beam) and a beam pair link (BPL) are introduced to a communications system.

The beam is a communication resource, and may also be referred to as a spatial domain filter (SDF), a transmission state indication (TCI), or the like.

Beams may be classified into a transmit beam and a receive beam. A beam forming technology may be a beamforming technology or another technical means. The beamforming includes transmit beamforming and receive beamforming.

Optionally, a plurality of beams having a same or similar communication feature may be considered as one beam. One beam may include one or more antenna ports that are used to transmit a data channel, a control channel, a sounding signal, and the like.

The transmit beam may be distribution of signal strength formed in different space directions after a signal is transmitted by using an antenna. A transmit end sends a signal with a beamforming weight, so that the sent signal forms a beam with spatial directivity. In an uplink direction, the transmit end may be a terminal. In a downlink direction, the transmit end may be a network device.

The receive beam may be distribution of strengthening or weakening reception of a wireless signal in different space directions by an antenna array. A receive end receives a signal with a beamforming weight, so that the received signal forms a beam with spatial directivity. In an uplink direction, the receive end may be a network device. In a downlink direction, the receive end may be a terminal.

Transmit beamforming: When a transmit-end device with an antenna array sends a signal, a specific amplitude and phase are set on each antenna element of the antenna array, so that the sent signal has spatial directivity, that is, the signal has high signal power in some directions, and has low signal power in some directions. A direction with highest signal power is a direction of the transmit beam. The antenna array includes a plurality of antenna elements, and the additional specific amplitude and phase are beamforming weights.

Receive beamforming: When a receive-end device with an antenna array receives a signal, a specific amplitude and phase are set on each antenna element of the antenna array, so that a power gain of the received signal is directional, that is, the power gain is high when signals in some directions are received, and the power gain is low when signals in some directions are received. A direction with a highest power gain when a signal is received is a direction of the receive beam. The antenna array includes a plurality of antenna elements, and the additional specific amplitude and phase are beamforming weights.

Sending a signal by using a transmit beam is sending the signal by using a beamforming weight.

Receiving a signal by using a receive beam is receiving the signal by using a beamforming weight.

Different beams may be considered as different resources, and same information or different information may be sent by using (through) different beams.

The beam pair link is based on a beam concept. A beam pair link generally includes a transmit beam of a transmit-end device and a receive beam of a receive-end device.

In a communications system, each of the network device and the terminal device may generate one or more transmit beams and one or more receive beams. Before data is transmitted, beam alignment needs to be performed.

It may be understood that one or more antenna ports forming one beam may also be considered as an antenna port set. In a current NR protocol, the beam can be reflected by an antenna port quasi colocation (QCL) relationship. QCL is quasi colocation (QCL).

Specifically, two signals of a same beam have a QCL relationship related to a spatial receive parameter (spatial Rx parameter), that is, QCL-Type D in the current protocol: {Spatial Rx parameter}.

In a standard protocol, identifiers of beams may be identifiers of various signals.

For example, the identifier of the beam may be a resource identifier (ID) of a channel state information reference signal (CSI-RS). Alternatively, the identifier of the beam may be a time domain index of a synchronization signal/physical broadcast channel (SS/PBCH). Alternatively, the identifier of the beam may be a resource ID of a sounding reference signal (SRS). Alternatively, the identifier of the beam may be a resource ID of a tracking reference signal (TRS) or the like.

Based on the concepts described above, a beam indication method provided in this application is described below.

This application provides a beam indication method 200 and a beam indication method 300. Compared with the conventional technology, scheduling overheads for scheduling, by a network device, a terminal device to receive a downlink signal and to send an uplink signal may be reduced by using the two methods. The method 200 and the method 300 are separately described below.

In the method 200, the terminal device receives first information from the network device. The first information is used to determine a first receive beam for the downlink signal and a first transmit beam for the uplink signal. The terminal device determines the first receive beam for the downlink signal and the first transmit beam for the uplink signal based on the first information.

In other words, in the method 200, the terminal device receives, from the network device, first information indicating a beam, and the terminal device may determine both the receive beam for the downlink signal and the transmit beam for the uplink signal based on the first information.

Figure 2:
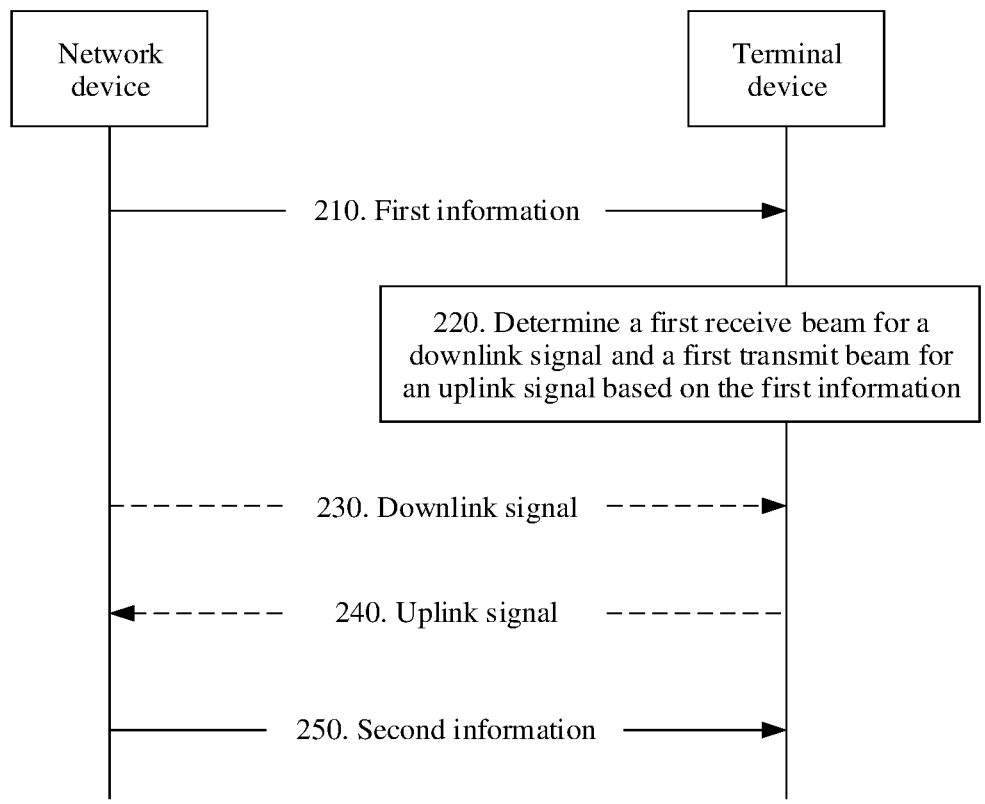
FIG. 2 is a schematic flowchart of a beam indication method 200 according to this application.

FIG. 2 is a schematic flowchart of a beam indication method 200 according to this application.

210. A network device sends first information to a terminal device. The terminal device receives the first information from the network device.

The first information is used to determine a first receive beam for a downlink signal and/or a first transmit beam for an uplink signal. Herein, the first information is used to determine the first receive beam for the downlink signal and/or the first transmit beam for the uplink signal. In other words, based on the first information, the terminal device may determine the first receive beam configured by the network device for the terminal device to receive the downlink signal, or the terminal device may determine the first transmit beam used to send the uplink signal, or the terminal device may determine both the first transmit beam and the first receive beam.

It should be noted that the network device may configure at least one receive beam for the terminal device to receive the downlink signal, or may configure at least one transmit beam for the terminal device to send the uplink signal. For example, the network device first configures one receive beam for the terminal device to receive the downlink signal, and subsequently configures another receive beam (in other words, configures a new receive beam). Similarly, the network device may also first configure one transmit beam for the terminal device to send the uplink signal, and subsequently configure another transmit beam. For another example, the network device configures, once, a plurality of receive beams for the terminal device to receive the downlink signal, and/or configures, once, a plurality of transmit beams for the terminal device to send the uplink signal. Therefore, the first receive beam and a second receive beam that are described for the downlink signal in this embodiment of this application are only used to distinguish between different receive beams configured by the network device for the terminal device to receive the downlink signal. The first transmit beam and a second transmit beam for the uplink signal are only used to distinguish between different transmit beams configured by the network device for the terminal device to send the uplink signal, and should not constitute any limitation to the technical solutions of this application.

It should be understood that a receive beam for the downlink signal is a beam used to receive the downlink signal. A transmit beam for the uplink signal is a beam used to send the uplink signal.

220. The terminal device determines the first receive beam for the downlink signal and/or the first transmit beam for the uplink signal based on the first information.

The terminal device may learn, based on step 210 and step 220, the first receive beam configured by the network device for the downlink signal and/or the first transmit beam configured by the network device for the uplink signal.

In a case, the terminal device determines the first receive beam and the first transmit beam based on the first information.

In another case, the terminal device determines only the first receive beam based on the first information. In this case, a possibility is that the terminal device needs to receive only the downlink signal. Another possibility is that the terminal device needs to receive the downlink signal and to send the uplink signal. In this case, the terminal device may use, as the first transmit beam, a beam same as the first receive beam, to determine the first receive beam and the first transmit beam.

In another case, the terminal device determines the first transmit beam based on the first information. A possibility is that the terminal device needs to send only the uplink signal. Another possibility is that the terminal device needs to receive the downlink signal and to send the uplink signal. In this case, the terminal device may use, as the first receive beam, a beam same as the first transmit beam, so that the first receive beam and the first transmit beam may be determined.

In this embodiment of this application, the first information may include a radio resource control (RRC) message, a media access control-control element (MAC-CE), downlink control information (DCI), or a broadcast message, or may be other information, another message, and/or the like.

The method 200 is described below by using an example in which the first information is the DCI.

For example, the network device configures one beam set for the terminal device to receive the downlink signal and/or to send the uplink signal, and the beam set includes a plurality of beams. First, the network device indicates the beam set to the terminal device by using an RRC message. Further, the network device selects a plurality of candidate beams from the beam set by using the MAC-CE and indicates the plurality of candidate beams to the terminal device. Then, when the network device needs to schedule the terminal device to receive the downlink signal and to send the uplink signal, the network device sends the DCI to the terminal device. The DCI is used to indicate which beam or beams among the plurality of candidate beams are respectively the receive beam for the downlink signal and the transmit beam for the uplink signal. The DCI herein may be considered as the first information in this embodiment of this application.

For another example, the network device first configures one beam set for the terminal device to receive the downlink signal and/or to send the uplink signal. Next, the network device indicates, to the terminal device by using the MAC-CE, which beam or beams in the beam set are respectively the receive beam for the downlink signal and the transmit beam for the uplink signal. The MAC-CE herein may be considered as the first information in this embodiment of this application.

A person skilled in the art may further design, according to the idea of the beam indication method 200 provided in this application, that the network device indicates, to the terminal device, a receive beam for the downlink signal and a transmit beam for the uplink signal by using other information or another message. This is not listed one by one herein.

In the conventional technology, both receiving the downlink signal and sending the uplink signal by the terminal device are respectively scheduled by the network device by using a PDCCH of the downlink signal and a PDCCH of the uplink signal. However, in the technical solution of the method 200, the network device indicates the receive beam for the downlink signal and/or the transmit beam for the uplink signal to the terminal device by using one piece of first information, so that the terminal device may determine the receive beam for the downlink signal and the transmit beam for the uplink signal based on the first information. Compared with performing scheduling for the uplink signal and the downlink signal by using respective PDCCHs, scheduling overheads are reduced.

For example, in a scenario in which centralized control is required (for example, uplink and downlink data scheduling during Industry 4.0), a downlink instruction of the network device and an uplink reply of the terminal device usually appear in pairs. Therefore, if the network device performs scheduling for each of the uplink signal and the downlink signal by using one PDCCH, scheduling overheads are relatively high. By contrast, if the technical solution of this application is used, receiving the downlink signal and sending the uplink signal are scheduled in pairs by using one piece of first information, so that scheduling overheads can be reduced.

It should be understood that the first information is used to schedule the receiving of the downlink signal and the sending of the uplink signal in pairs. In a manner, the first information explicitly indicates the receive beam for the downlink signal and the transmit beam for the uplink signal. In another manner, the first information indicates the receive beam for the downlink signal, and the terminal device determines the receive beam for the downlink signal based on the first information, and also uses the receive beam as the transmit beam for the uplink signal. In still another manner, the first information indicates the receive beam for the uplink signal, and the terminal device determines the transmit beam for the uplink signal based on the first information, and uses the transmit beam as the receive beam for the downlink signal. Therefore, when the terminal device needs to perform uplink and downlink transmission, the terminal device may always determine the receive beam for the downlink signal and the transmit beam for the uplink signal in pairs.

Alternatively, if the first information indicates only the receive beam for the downlink signal, and the terminal device needs to receive only the downlink signal, the terminal device determines the receive beam based on the first information. Alternatively, if the first information indicates only the transmit beam for the uplink signal, and the terminal device needs to send only the uplink signal, the terminal device determines the transmit beam based on the first information.

The scheduling overheads described herein may include signaling overheads and time overheads. In other words, according to the technical solution of this application, both the signaling overheads and the time overheads for scheduling the receiving of the downlink signal and the sending of the uplink signal may be reduced.

Correspondingly, in the beam indication method 200 provided in this application, scheduling the receive beam for the downlink signal and the transmit beam for the uplink signal may be completed once. Therefore, complexity of scheduling by the network device may also be reduced. In addition, for the terminal device, complexity and power consumption for receiving scheduling information (for example, DCI) may also be reduced.

Optionally, after the terminal device determines the receive beam for the downlink signal and the transmit beam for the uplink signal based on the first information, the method 200 may further include step 230.

230. The terminal device receives the downlink signal from the network device by using the first receive beam for the downlink signal.

Optionally, the method 200 may further include step 240.

240. The terminal device sends the uplink signal to the network device by using the first transmit beam for the uplink signal.

Before determining the first receive beam for the downlink signal and the first transmit beam for the uplink signal, the terminal device receives, by using the first receive beam, the downlink signal sent by the network device. Optionally, when an uplink signal is to be sent, the network device does not need to perform scheduling again, and the terminal device may use the first transmit beam to send the uplink signal to the network device.

In step 210, there may be a plurality of manners in which the network device indicates the receive beam for the downlink signal and the transmit beam for the uplink signal to the terminal device by using one piece of information. In other words, the network device performs scheduling for the downlink signal and the uplink signal in pairs by using one piece of information. The manners are described below one by one.

When the terminal device has a mutual beam difference, the network device separately configures one downlink reference signal for the terminal device to receive the downlink signal and to send the uplink signal. Refer to a manner 1.

Herein, the mutual beam difference is that the terminal device or the network device may determine, based on a parameter of the receive beam, a parameter corresponding to the transmit beam. Further, an error between a receive channel and a transmit channel during corresponding beamforming falls within X dB. For example, X=3.

Manner 1

The network device sends the first information to the terminal device. The first information includes first reference signal configuration information and second reference signal configuration information. The first reference signal configuration information is used to indicate an identifier of a first downlink reference signal, and the second reference signal configuration information is used to indicate an identifier of a second downlink reference signal.

In the manner 1, the first information includes the first reference signal configuration information and the second reference signal configuration information. The first reference signal configuration information indicates the identifier of the first downlink reference signal, and the terminal device determines the first downlink reference signal as the first receive beam for the downlink signal based on the identifier of the first downlink reference signal. The second reference signal configuration information indicates the identifier of the second downlink reference signal, and the terminal device determines the second downlink reference signal as the first transmit beam for the uplink signal based on the identifier of the second downlink reference signal.

For example, an example in which the first information is DCI is used. In the manner 1, the DCI may include two fields, and each field is used to carry an identifier of one reference signal. Herein, the two fields included in the DCI may correspond to the first reference signal configuration information and the second reference signal configuration information in this embodiment of this application.

According to the foregoing descriptions of the beam, it is learned that identifiers of beams may be identifiers of some reference signals. Therefore, in this embodiment of this application, an identifier of an uplink reference signal or an identifier of a downlink reference signal is an identifier of a beam. In other words, the first information is used to simultaneously indicate identifiers of two beams. An identifier of one beam is an identifier of the receive beam for the downlink signal, and an identifier of the other beam is an identifier of the transmit beam for the uplink signal. Therefore, the terminal device may determine, based on identifiers, indicated by the network device, of uplink reference signals and/or downlink reference signals, the receive beam configured by the network device for the downlink signal and the transmit beam configured by the network device for the uplink signal.

It should be understood that, in this embodiment of this application, the network device indicating the receive beam for the downlink signal to the terminal device includes that the network device indicates a parameter of the receive beam for the downlink signal to the terminal device. The network device indicating the transmit beam for the uplink signal to the terminal device includes that the network device indicates a parameter of the transmit beam for the uplink signal to the terminal device.

For example, the network device indicating a downlink beam is that the network device indicates a beam parameter used to receive the downlink beam. The network device indicating an uplink beam is that the network device indicates a beam parameter used by the terminal device to transmit the uplink beam.

Optionally, in an embodiment, the first downlink reference signal and the second downlink reference signal each may be any one of the following signals: a synchronization signal block (SS/PBCH block), a CSI-RS, a PDCCH DMRS, or a PDSCH DMRS.

For example, the first downlink reference signal is a CSI-RS, and the second downlink reference signal is a PDCCH DMRS. For another example, both the first downlink reference signal and the second downlink reference signal are synchronization signal blocks. For another example, the first downlink reference signal is a PDSCH DMRS, and the second downlink reference signal is a CSI-RS. Other cases are not listed again.

When the terminal device has no mutual beam difference, the network device configures one downlink reference signal for the terminal device to receive the downlink signal, and configures one downlink reference signal for the terminal device to send the uplink signal. Refer to a manner 2.

Manner 2

The network device sends the first information to the terminal device. The first information includes third reference signal configuration information and fourth reference signal configuration information. The third reference signal configuration information is used to indicate an identifier of a third downlink reference signal, and the fourth reference signal configuration information is used to indicate an identifier of a first uplink reference signal.

Correspondingly, in step 220, the terminal device determines the third downlink reference signal as the receive beam for the downlink signal based on the identifier, indicated by the third reference signal configuration information, of the third downlink reference signal. The terminal device determines the first uplink reference signal as the transmit beam for the uplink signal based on the identifier, indicated by the fourth reference signal configuration information, of the first uplink reference signal.

That is, in the manner 2, the network device indicates one downlink beam as the receive beam for the downlink signal to the terminal device, and indicates one uplink beam as the transmit beam for the uplink signal.

Similarly, an example in which the first information is DCI is used. The DCI may include two fields, and each of the two fields may carry an identifier of one reference signal. Herein, the two fields included in the DCI may correspond to the third reference signal configuration information and the fourth reference signal configuration information in the manner 2.

Similar to the first downlink reference signal and the second downlink reference signal in the manner 1, the third downlink reference signal may be any one of the following signals: an SS/PBCH, a CSI-RS, a PDCCH DMRS, and a PDSCH DMRS.

In addition, the first uplink reference signal may be any one of the following signals: a physical uplink control channel (PUCCH) demodulation reference signal (DMRS), a physical uplink shared channel (PDSCH) demodulation reference signal (DMRS), a sounding reference signal (SRS), and a physical random access channel (PRACH).

In the manner 2, the network device indicates both the first receive beam for the downlink signal and the first transmit beam for the uplink signal by using one piece of first information. The terminal device may pre-schedule the first transmit beam indicated by the network device for the uplink signal, to reduce a delay.

The manner 1 and the manner 2 are described below with reference to FIG. 3 by using an example.

Figure 3:
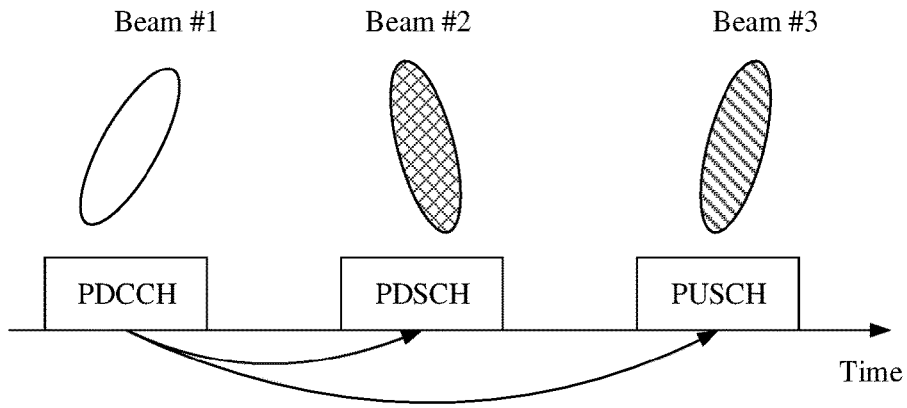
FIG. 3 is an example of a beam indication method 200 according to this application.

In FIG. 3, an example in which the downlink signal is a PDSCH is used, and an example in which the uplink signal is a PUSCH is used.

FIG. 3 is an example of the beam indication method 200 according to this application. As shown in FIG. 3, the network device sends a PDCCH to the terminal device by using a beam #1. The PDCCH carries DCI, and the DCI is used to indicate that a receive beam for the PDSCH is a beam #2 and that a transmit beam for the PUSCH is a beam #3.

Optionally, in an embodiment, the network device may pre-agree with the terminal device about that the terminal device has a same beam parameter or beamforming parameter of the receive beam for the downlink signal and the transmit beam for the uplink signal.

The beam parameter or beamforming parameter may include one or more of a beam direction, a beam gain, a Doppler frequency shift, a Doppler spread, a delay, a delay spread, a spatial receive parameter, and a spatial transmit parameter.

In this way, the network device needs to indicate only one beam to the terminal device, and the terminal device uses the beam as both the receive beam for the downlink signal and the transmit beam for the uplink signal. Refer to a manner 3.

Manner 3

The network device sends the first information to the terminal device. The first information is used to indicate an identifier of a fourth downlink reference signal. The terminal device receives the first information from the network device, and determines the fourth downlink reference signal as the first receive beam for the downlink signal and the first transmit beam for the uplink signal based on the identifier of the fourth downlink reference signal.

Alternatively, the first information is used to indicate an identifier of a second uplink reference signal. The terminal device receives the first information from the network device, and determines the second uplink reference signal as the first transmit beam for the uplink signal and the first receive beam for the downlink signal based on the identifier of the second uplink reference signal.

It should be understood that, in the manner 3, the network device has agreed with the terminal device about that a parameter of the receive beam for the downlink signal and a parameter of the transmit beam for the uplink signal are the same. Therefore, the network device may indicate only one beam to the terminal device. For example, the network device may indicate the receive beam for the downlink signal. The terminal device determines the receive beam for the downlink signal, and also determines the transmit beam for the uplink signal. Alternatively, the network device may indicate the transmit beam for the uplink signal. The terminal device determines the transmit beam for the uplink signal, and also determines the receive beam for the downlink signal.

Similarly, continue using the example in which the first information is DCI, and the network device may carry an identifier of a reference signal by using one field in the DCI. When the terminal device has a mutual beam difference, the identifier of the reference signal may be an identifier of a downlink reference signal, or may be an identifier of an uplink reference signal.

The manner 3 is described below with reference to FIG. 4 by using an example.

Figure 4:
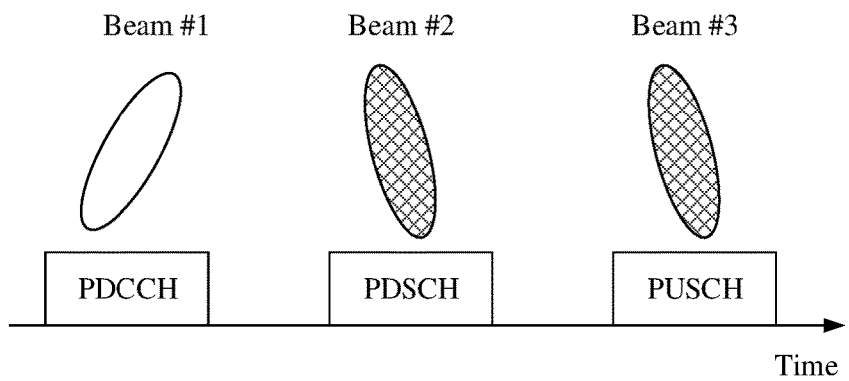
FIG. 4 is another example of a beam indication method 200 according to this application.

FIG. 4 is another example of the beam indication method 200 according to this application. As shown in FIG. 4, the network device pre-agrees with the terminal device about that a parameter of a receive beam for a PDSCH is the same as a parameter of a transmit beam for a PUSCH. The network device sends a PDCCH to the terminal device by using a beam #1. The PDCCH carries the DCI, and the DCI is used to indicate a beam #2. The terminal device determines, based on the received DCI, the beam #2 as both a beam for receiving the PDSCH and a beam for sending the PUSCH.

Optionally, the receive beam for the PDSCH and the transmit beam for the PUSCH are the same as a receive beam for the PDCCH.

It should be understood that FIG. 4 only shows that the network device indicates the receive beam for the PDSCH and the transmit beam for the PUSCH to the terminal device through the PDCCH. The network device may further perform indication by using another message and/or other information.

In the foregoing manners, the network device may explicitly or implicitly indicate the receive beam for the downlink signal and the transmit beam for the uplink signal to the terminal device. This is not limited in this application.

Optionally, in the foregoing manners, the network device may periodically indicate the receive beam for the downlink signal and the transmit beam for the uplink signal to the terminal device. For example, at regular intervals, the network device re-indicates the receive beam for the downlink signal and the transmit beam for the uplink signal to the terminal device.

Optionally, after indicating the receive beam for the downlink signal and the transmit beam for the uplink signal to the terminal device, only when the receive beam for the downlink signal or the transmit beam for the uplink signal or both need to be updated, the network device indicates a reconfigured receive beam for the downlink signal and/or a reconfigured transmit beam for the uplink signal to the terminal device. Herein, and/or means that the network device may reconfigure only the receive beam for the downlink signal, or reconfigure only the transmit beam for the uplink signal, or may reconfigure both the receive beam for the downlink signal and the transmit beam for the uplink signal. Therefore, the method 200 may further include step 250.

250. The terminal device receives second information from the network device, where the second information is used to indicate a second receive beam for the downlink signal and/or a second transmit beam for the uplink signal.

It should be understood that a manner in which the network device indicates the second receive beam for the downlink signal and/or the second transmit beam for the uplink signal to the terminal device by using the second information may be the same as the manner in which the network device indicates the first receive beam for the downlink signal and the first transmit beam for the uplink signal to the terminal device by using the first information. Details are not described herein again.

It should be understood that "and/or" in step 250 means that the network device may indicate only the second receive beam for the downlink signal by using the second information, or indicate only the second transmit beam for the uplink signal, or indicate both the second transmit beam for the downlink signal and the second transmit beam for the uplink signal.

In an implementation, the network device pre-defines a default beam configuration for the terminal device, and the default beam configuration includes the receive beam for the downlink signal and the transmit beam for the uplink signal. When the terminal device does not receive information delivered by the network device for updating the receive beam for the downlink signal and/or the transmit beam for the uplink signal (for example, the second information), the terminal device may use the default beam configuration all through. If the terminal device receives the information delivered by the network device for updating the receive beam for the downlink signal and/or the transmit beam for the uplink signal (for example, the second information), a default receive beam for the downlink signal and a default transmit beam for the uplink signal are updated.

Figure 5:
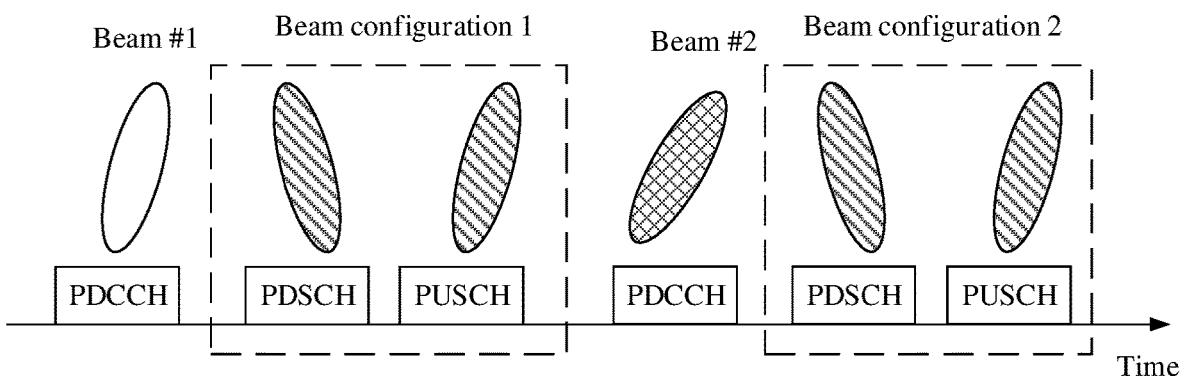
FIG. 5 is still another example of a beam indication method 200 according to this application.

With reference to FIG. 5, a process in which the network device updates the receive beam for the downlink signal and the transmit beam for the uplink signal is described below by using an example.

FIG. 5 is still another example of the beam indication method 200 according to this application. As shown in FIG. 5, continue using an example in which a downlink signal is a PDSCH and an example in which an uplink signal is a PUSCH. For ease of understanding, two time periods are introduced in FIG. 5. In a first time period, a network device sends a PDCCH #1 to a terminal device by using a beam #1. The PDCCH #1 carries DCI #1, and the DCI #1 is used to indicate a beam configuration (denoted as a beam configuration 1 below) used by the terminal device to receive the PDSCH and to send the PUSCH in the first time period. In the first time period, the terminal device receives the PDSCH by using a receive beam indicated in the beam configuration 1, and sends the PUSCH by using a transmit beam indicated in the beam configuration 1. In a second time period, the network device sends a PDCCH #2 to the terminal device by using a beam #2. The PDCCH#2 carries DCI #2, and the DCI #2 is used to indicate a beam configuration (denoted as a beam configuration 2 below) used by the terminal device to receive the PDSCH and to send the PUSCH in the second time period. That is, the network device indicates the terminal device to update a beam for receiving the PDSCH and a beam for sending the PUSCH. Therefore, in the second time period, the terminal device receives the PDSCH based on a receive beam indicated by the beam configuration 2, and sends the PUSCH by using a transmit beam indicated by the beam configuration 2.

It should be understood that the first time period and the second time period that are in FIG. 5 are any two time periods in time. The first time period and the second time period may be consecutive or inconsecutive in time. Duration of the first time period and duration of the second time period are not limited, and the two time periods are introduced only for describing this embodiment of this application.

After determining, based on the second information, the second receive beam reconfigured by the network device for the downlink signal, the terminal device receives the downlink signal by using the second receive beam, and/or after determining, based on the second information, the second transmit beam reconfigured by the network device for the uplink signal, the terminal device receives the downlink signal by using the second transmit beam.

The method 200 that is used by the network device to indicate a beam to the terminal device and that is provided in this application is described in the foregoing manner 1, manner 2, and manner 3. Another method 300 that is used by the network device to indicate a beam to the terminal device and that is provided in this application is described below with reference to a manner 4.

It should be noted that, to distinguish from the numbers "first", "second", and the like appearing in the method 200, a receive beam for a downlink signal, a transmit beam for an uplink signal, and information that appears in the method 300 are renumbered in the method 300. It should be understood that the numbers are introduced only to distinguish between different information, receive beams, and transmit beams, and should not constitute any limitation to the technical solutions implemented by this application.

In the method 300, the terminal device receives third information from the network device. The terminal device may first determine the receive beam for the downlink signal based on the third information. The terminal device receives the downlink signal by using the receive beam, and the downlink signal carries fourth information indicating the transmit beam for the uplink signal. The terminal device then determines the transmit beam for the uplink signal based on the fourth information.

Manner 4

The network device sends the third information to the terminal device. The third information is used to indicate a third receive beam for the downlink signal. The terminal device receives the downlink signal by using the third receive beam, and the downlink signal carries the fourth information indicating a third transmit beam for the uplink signal.

Figure 6:
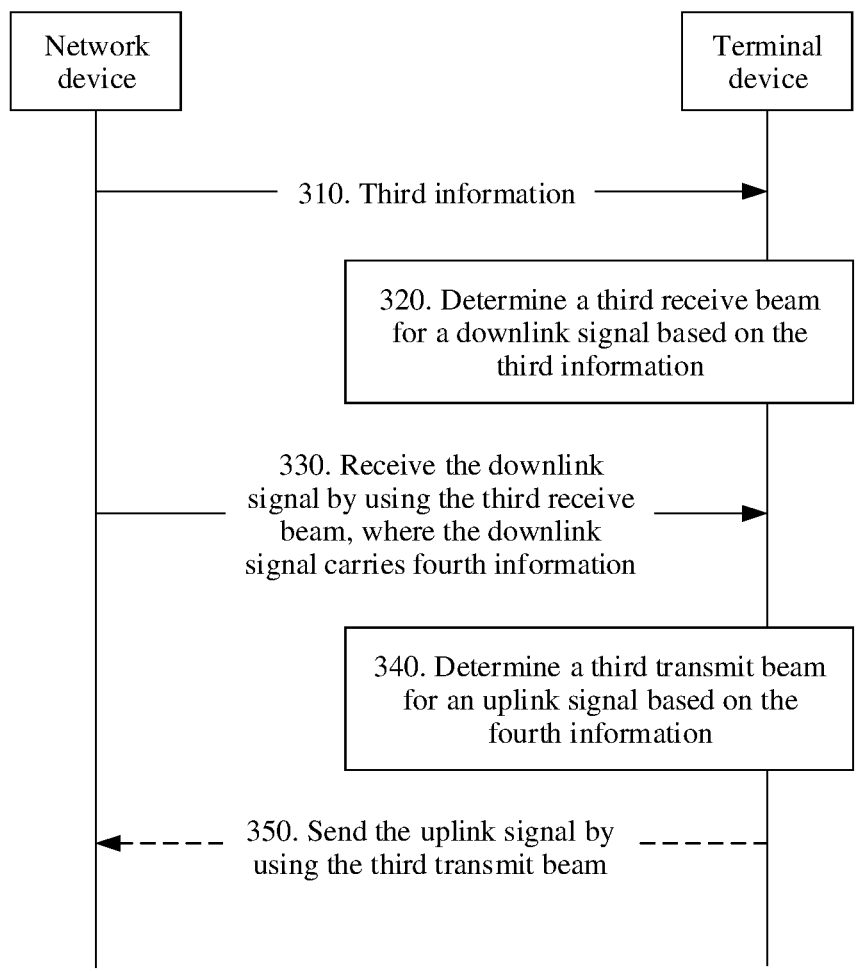
FIG. 6 is a schematic flowchart of a beam indication method 300 according to this application.

FIG. 6 is a schematic flowchart of a beam indication method 300 according to this application.

310. A network device sends third information to a terminal device, and the terminal device receives the third information from the network device. The third information is used to indicate a third receive beam for a downlink signal.

320. The terminal device determines the third receive beam for the downlink signal based on the third information.

330. The terminal device receives the downlink signal from the network device by using the third receive beam, the downlink signal carries fourth information, and the fourth information is used to indicate a third transmit beam for the uplink signal.

340. The terminal device determines the third transmit beam for the uplink signal based on the fourth information.

In the manner 4, the receive beam for the downlink signal and the transmit beam for the uplink signal are indicated in a chain mode. The network device first indicates the third receive beam for the downlink signal by using the third information. The terminal device receives the downlink signal by using the third receive beam, and the downlink signal carries the fourth information indicating the third transmit beam for the uplink signal. Therefore, the terminal device respectively determines the receive beam for the downlink signal and the transmit beam for the uplink signal based on the third information and the fourth information.

In the technical solution of the method 300, the network device indicates the receive beam for the downlink signal and the transmit beam for the uplink signal to the terminal device in a "chain" mode. It may be understood that, although the network device indicates only the receive beam (that is, the third receive beam) for the downlink signal by using the third information, the terminal device receives the downlink signal by using the receive beam, and the downlink signal further carries the fourth information indicating the transmit beam (in other words, the third transmit beam) for the uplink signal. Therefore, while receiving the downlink signal, the terminal device also determines the third transmit beam for the uplink signal based on the fourth information carried in the downlink signal. Therefore, the network device also needs to perform scheduling only once to complete scheduling of receiving the downlink signal and sending the uplink signal by the terminal device, to reduce scheduling overheads.

Same as the method 200, in the method 300, the third information also includes a radio resource control (RRC) message, a media access control-control element (MAC-CE), or downlink control information (DCI), or may be other information, another message, and/or the like.

The method 300 is described by using an example in which the third information is the DCI.

For example, the network device configures one beam set for the terminal device to receive the downlink signal and/or to send the uplink signal, and the beam set includes a plurality of beams. First, the network device indicates the beam set to the terminal device by using an RRC message. Further, the network device selects a plurality of candidate beams from the beam set by using the MAC-CE and indicates the plurality of candidate beams to the terminal device. Then, the network device sends the DCI to the terminal device. The DCI is used to indicate which beam or beams among the plurality of candidate beams are specifically the third receive beam for the downlink signal. The DCI herein may be considered as the third information in this embodiment of this application. Further, the network device sends the downlink signal to the terminal device, and adds, to the downlink signal, fourth information indicating the third transmit beam used by the terminal device to send the uplink signal. In this way, the terminal device determines the third receive beam for the downlink signal based on the DCI, and receives the downlink signal by using the third receive beam. Further, the terminal device obtains, from the received downlink signal, the fourth information indicating the third transmit beam for the uplink signal, so that the terminal device may determine the third transmit beam for the uplink signal based on the fourth information. Similar cases are not listed one by one again.

Optionally, in an embodiment, when the terminal device has a mutual beam difference, the fourth information configured by the network device is used to indicate identifiers of a plurality of downlink reference signals.

Optionally, when the fourth information is used to indicate the plurality of downlink reference signals, the terminal device determines the third transmit beam for the uplink signal based on one of the plurality of downlink reference signals indicated by the fourth information. In other words, the terminal device selects one from the plurality of downlink reference signals indicated by the fourth information, to determine the third transmit beam for the uplink signal. For example, the terminal device determines the transmit beam for the uplink signal based on one, with best or better quality, selected from the plurality of downlink reference signals indicated by the fourth information. Alternatively, the terminal device may poll and send the uplink signal by using the plurality of downlink reference signals indicated by the fourth information. In other words, the terminal device uses all the plurality of downlink reference signals as the transmit beam for the uplink signal.

Optionally, in an embodiment, when the terminal device has no mutual beam difference, the fourth information configured by the network device is used to indicate identifiers of one or more uplink reference signals.

Optionally, the terminal device determines the third transmit beam for the uplink signal based on one of the one or more uplink reference signals indicated by the fourth information. For example, the terminal device may select one with better or best quality from the plurality of uplink reference signals indicated by the fourth information, or may randomly select one from the plurality of uplink reference signals, or may select one uplink reference signal as the third transmit beam for the uplink signal according to another rule. In this application, a manner in which the terminal device selects the third transmit beam for the uplink signal from the plurality of uplink reference signals is not limited. Alternatively, the terminal device may poll and send the uplink signal by using the plurality of uplink reference signals indicated by the fourth information. In other words, the terminal device uses all the plurality of uplink reference signals as the transmit beam for the uplink signal.

The method that is used by the network device to indicate a beam to the terminal device and that is described in the manner 4 is described below with reference to FIG. 7.

Figure 7:
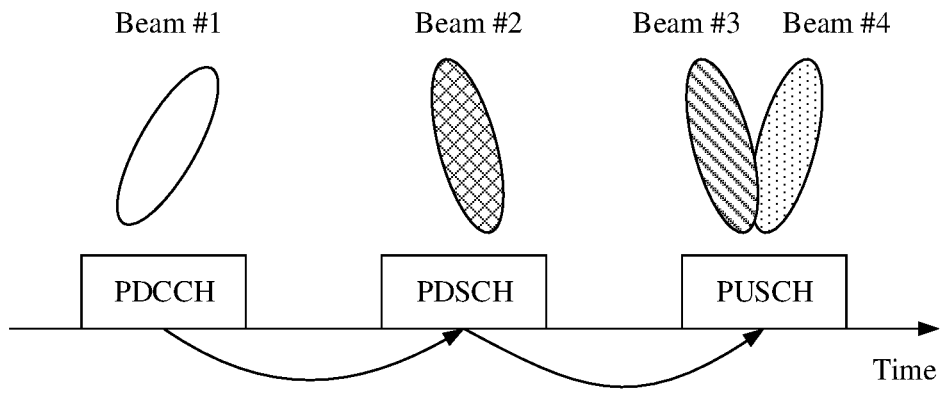
FIG. 7 is an example of a beam indication method 300 according to this application.

FIG. 7 is an example of the beam indication method 300 according to this application. In FIG. 7, an example in which a downlink signal is a PDCCH is used, and an example in which an uplink signal is a PUSCH is used. As shown in FIG. 7, the network device sends a PDCCH to the terminal device by using a beam #1. The PDCCH carries DCI, and the DCI is used to indicate a receive beam (denoted as a beam #2) for a PDSCH. The terminal device receives the PDSCH from the network device by using the beam #2. The PDSCH also indicates a transmit beam for the PUSCH. Specifically, the PDSCH indicates a beam #3 and a beam #4 as the transmit beam for the PUSCH. It should be understood that only an example in which the network device indicates two transmit beams (that is, the beam #3 and the beam #4) for the PUSCH is used in FIG. 4. The network device may further indicate at least two beams as the transmit beam for the PUSCH.

In step 340, after the terminal device determines the third transmit beam for the uplink signal, the method 300 may further include step 350.

350. The terminal device sends the uplink signal to the network device by using the third transmit beam for the uplink signal. The network device receives the uplink signal from the terminal device.

Optionally, in the method 300, the network device may also update the receive beam for the downlink signal and/or the transmit beam for the uplink signal. The method 300 may further include step 360.

360. The terminal device receives fifth information from the network device, and the fifth information is used to indicate a fourth receive beam for the downlink signal and/or a fourth transmit beam for the uplink signal.

After determining the fourth receive beam for the downlink signal and the fourth transmit beam for the uplink signal based on the fifth information, the terminal device receives, by using the fourth receive beam, the downlink signal from the network device, and sends the uplink signal to the network device by using the fourth transmit beam.

Optionally, the fifth information also includes a radio resource control (RRC) message, a media access control-control element (MAC-CE), or downlink control information (DCI), or may be other information, another message, and/or the like.

It should be understood that step 360 is a process in which the network device indicates the terminal device to update the receive beam for the downlink signal and/or the transmit beam for the uplink signal. Step 360 may be combined with the method 200. To be specific, during beam indication, the network device indicates the receive beam for the downlink signal and the transmit beam for the uplink signal to the terminal device by using the method 300. During next beam indication, the network device indicates a new receive beam for the downlink signal and a new transmit beam for the uplink signal to the terminal device by using the method 200. Alternatively, the network device may indicate the receive beam for the downlink signal and the transmit beam for the uplink signal to the terminal device by using the method 200 or the method 300 all through.

The method 200 and the method 300 that are provided in this application and that are used by the network device to indicate the receive beam for the downlink signal and the transmit beam for the uplink signal to the terminal device are described above in detail with reference to FIG. 1 to FIG. 7.

In the embodiment of the method 200 provided in this application, a time interval between a time (denoted as a first time) for receiving the downlink signal by the terminal device by using the first receive beam indicated by the network device and a time (denoted as a second time) for sending the uplink signal by the terminal device by using the first transmit beam indicated by the network device needs to be met. The time interval is related to a plurality of factors of the terminal device. For example, the time interval is related to one or more of a beam switching capability of the terminal device, a processing delay of a physical layer and a processing delay of a MAC layer, a panel switching capability, and the like. In addition, the time interval also reflects a scheduling capability of the network device.

It should be understood that, in the method 300, a time interval between a time for receiving the downlink signal by the terminal device by using the third receive beam and a time for sending the uplink signal by the terminal device by using the third transmit beam also needs to meet the time interval.

Optionally, the time interval may be pre-agreed between the network device and the terminal device, or may be notified by the network device to the terminal device. To accurately configure the time interval, the terminal device may report, to the network device, a capability of switching a beam and/or an antenna panel (panel) by the terminal device. The network device configures the time interval based on the capability of switching a beam and/or an antenna panel by the terminal device. Alternatively, the network device may configure the time interval by comprehensively considering the capability, reported by the terminal device, of switching a beam and/or an antenna panel by the terminal device and a scheduling capability of the network device. After the configuration is completed, the network device sends time interval information to the terminal device. The time interval information is used to indicate the time interval configured between the first time and the second time by the network device.

The terminal device may store a preset threshold. The preset threshold is used by the terminal device to determine whether to switch from the receive beam for the downlink signal to the transmit beam for the uplink signal. The preset threshold is usually set based on the beam switching capability of the terminal device. Specifically, after receiving the time interval information from the network device, the terminal device determines a value relationship between the time interval indicated by the time interval information and the preset threshold. If the time interval indicated by the time interval information is less than the preset threshold, it indicates that the beam switching capability of the terminal device may not meet a requirement of the time interval indicated by the network device. Therefore, the terminal device may not perform switching from the receive beam for the downlink signal to the transmit beam for the uplink signal. If the time interval indicated by the time interval information is equal to or greater than the preset threshold, after receiving the downlink signal by using the receive beam, the terminal device switches to the transmit beam to send the uplink signal.

The method 200 is used as an example. If the terminal device receives the time interval information before step 250, the receive beam configured by the network device for the downlink signal is the first receive beam, and the transmit beam for the uplink signal beam is the first transmit beam. If the time interval indicated by the time interval information is less than the preset threshold, after receiving the downlink signal by using the first receive beam, the terminal device does not switch from the first receive beam to the first transmit beam to send the uplink signal. If the time interval indicated by the time interval information is equal to or greater than the preset threshold, after receiving the downlink signal by using the first receive beam, the terminal device switches from the first receive beam to the first transmit beam to send the uplink signal.

If the terminal device receives the time interval information after step 250, the receive beam configured by the network device for the downlink signal is the second receive beam, and the transmit beam for the uplink signal is the second transmit beam. If the time interval indicated by the time interval information is less than the preset threshold, after receiving the downlink signal by using the second receive beam, the terminal device does not switch from second receive beam to the second transmit beam to send the uplink signal. If the time interval indicated by the time interval information is equal to or greater than the preset threshold, after receiving the downlink signal by using the second receive beam, the terminal device switches from second receive beam to the second transmit beam to send the uplink signal.

In the method 300, whether the terminal device needs to perform beam switching (for example, switching from the third receive beam to the third transmit beam, or switching from the fourth receive beam to the fourth transmit beam) is also determined based on the value relationship between the time interval indicated by the time interval information and the preset threshold. Descriptions are the same as the descriptions in the method 200, and details are not described herein again.

Further, after the terminal device determines the first receive beam for the downlink signal according to the foregoing method 200, in the process of receiving the downlink signal by using the first receive beam, if the terminal device detects that a beam failure occurs on the first receive beam, the terminal device may no longer send the uplink signal to the network device by using the first transmit beam indicated by the first information for the uplink signal. Similarly, after the terminal device determines the third receive beam for the downlink signal according to the foregoing method 300, in the process of receiving the downlink signal by using the third receive beam, if the terminal device detects that a beam failure occurs on the third receive beam, the terminal device no longer sends the uplink signal to the network device by using the third transmit beam indicated by the fourth information for the uplink signal.

When the beam failure occurs on the third receive beam, the terminal device may perform uplink transmission with the network device by using a beam configured by the network device for rectifying the beam failure.

The uplink transmission described herein includes that the terminal device sends one or more of the following content to the network device by using the beam for rectifying the beam failure, including a beam failure rectification request, an acknowledgement (ACK) or a negative acknowledgement (NACK), a PUSCH, a PUCCH, an SRS, and a PRACH.

A case in which a beam failure occurs on the receive beam for the downlink signal is described below by using an example with reference to FIG. 8.

Figure 8:
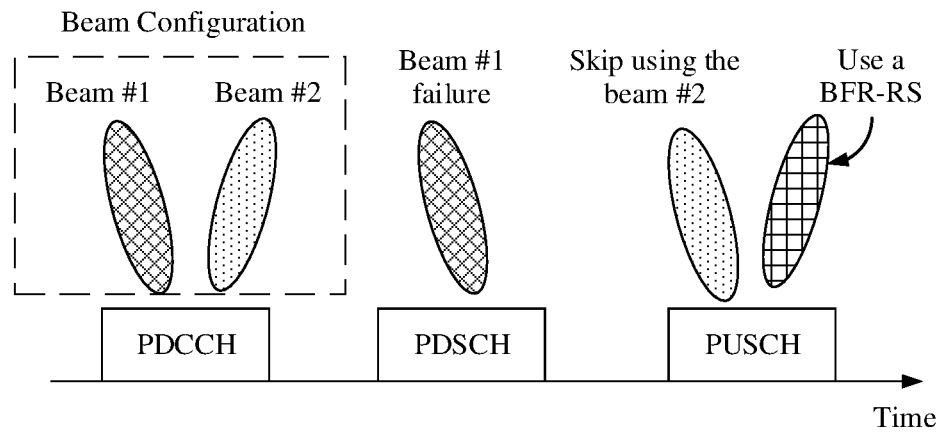
FIG. 8 is an example of occurrence of a beam failure in a PDSCH receiving process.

FIG. 8 is an example of occurrence of a beam failure in a PDSCH receiving process. As shown in FIG. 8, a network device sends a PDCCH to a terminal device. The PDCCH indicates a receive beam (denoted as a beam #1) for the PDSCH and a transmit beam (denoted as a beam #2) for the PUSCH, and the receive beam and the transmit beam are configured by the network device for the terminal device. After receiving the PDCCH, the terminal device detects that a beam failure occurs on the beam #1 in a process of receiving the PDSCH by using the beam #1. Next, the terminal device no longer sends the PUSCH to the network device by using the beam #2. Optionally, the terminal device performs uplink transmission by using a beam corresponding to a reference signal (corresponding to a BFR-RS marked in FIG. 8) configured by the network device for rectifying a beam failure. For example, a beam failure rectification request, a PRACH, a PUCCH, a PDSCH, an SRS, and the like are sent to the network device by using the beam corresponding to the BFR-RS.

It should be noted that during wireless communication between the terminal device and the network device, in some scenarios, for example, the terminal device moves outside a coverage area of an antenna beam, or due to presence of an obstruction, or if a direction of a receive beam of the terminal device is inconsistent with a direction of a transmit beam of the network device, the communication between the terminal device and the network device is to be interrupted, in other words, a beam failure occurs. In this case, the beam failure needs to be rectified. Therefore, in consideration of occurrence of the beam failure, usually, the network device configures, for the terminal device, the reference signal for rectifying the beam failure. In this embodiment of this application, the beam corresponding to the reference signal configured by the network device for the terminal device for rectifying the beam failure may be used by the terminal device to send an uplink channel to the network device, or to perform other uplink transmission, when a beam failure occurs on a receive beam indicated by the network device for a downlink channel.

When receiving the foregoing uplink channel, signal, or request signal sent by the terminal device, the network device may learn that a beam failure has occurred, so as to indicate the receive beam for the downlink channel to the terminal device again. Optionally, the receive beam for the downlink channel and the transmit beam for the uplink channel may also be indicated again.

The beam indication method provided in this application is described above in detail with reference to FIG. 1 to FIG. 8. The following describes a communications apparatus provided in this application.

Figure 9:
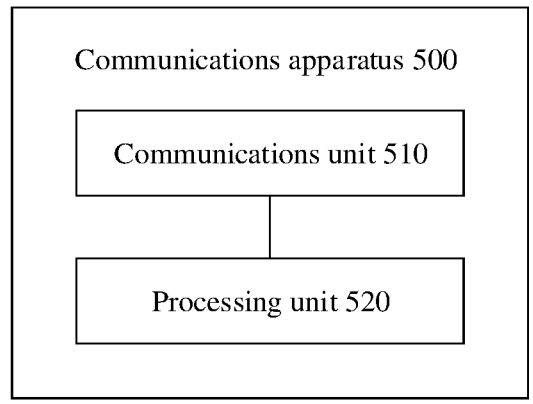
FIG. 9 is a schematic structural block diagram of a communications apparatus 500 according to this application.

FIG. 9 is a schematic structural block diagram of a communications apparatus 500 according to this application. As shown in FIG. 9, the apparatus 500 includes a communications unit 510 and a processing unit 520.

Optionally, the communications apparatus 500 may correspond to the beam indication method 200 provided in this application and the terminal device in the various embodiments of the beam indication method 200. The units included in the communications apparatus 500 are respectively configured to perform the method 200 and the corresponding operation and/or procedure in the various embodiments of the method 200.

Specifically, the communications unit 510 and the processing unit 520 are respectively configured to perform the following operations, including the communications unit 510 is configured to receive first information from a network device, where the first information is used to determine a first receive beam for a downlink signal and/or a first transmit beam for an uplink signal, and the processing unit 520 is configured to determine the first receive beam for the downlink signal and/or the first transmit beam for the uplink signal based on the first information received by the communications unit 510.

Alternatively, the communications apparatus 500 may correspond to the beam indication method 300 provided in this application and the terminal device in the various embodiments of the beam indication method 300. The units included in the communications apparatus 500 are respectively configured to perform the method 300 and the corresponding operation and/or procedure performed by the terminal device in the various embodiments of the method 300.

Specifically, the communications unit 510 and the processing unit 520 are respectively configured to perform the following operations, including the communications unit 510 is configured to receive third information from a network device, where the third information is used to indicate a third receive beam for an uplink signal, the processing unit 520 is configured to determine the third receive beam based on the third information received by the communications unit 510, the communications unit 510 is further configured to receive the downlink signal from the network device by using the first receive beam, where the downlink signal carries fourth information, and the fourth information is used to indicate a third transmit beam for the uplink signal, and the processing unit 520 is further configured to determine the third transmit beam based on the fourth information.

Optionally, the communications apparatus 500 may also be a chip or an integrated circuit installed in the terminal device.

Optionally, the communications unit 510 may be a transceiver, and the processing unit 520 may be a processor. The transceiver may include a transmitter and a receiver that together implement a function of the transceiver. Alternatively, the communications unit 510 may be an input/input interface or an input/output circuit.

Figure 10:
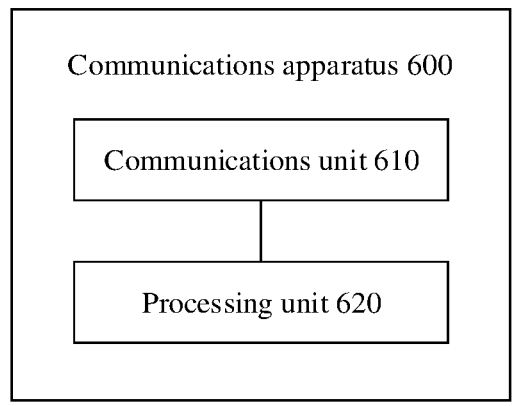
FIG. 10 is a schematic structural block diagram of a communications apparatus 600 according to this application.

FIG. 10 is a schematic structural block diagram of a communications apparatus 600 according to this application. As shown in FIG. 10, the apparatus 600 includes a processing unit 610 and a communications unit 620.

Optionally, the communications apparatus 600 may correspond to the beam indication method 200 provided in this application and the network device in the various embodiments of the beam indication method 200, or may be a chip or an integrated circuit installed in the network device.

Specifically, the processing unit 610 and the communications unit 620 are respectively configured to perform the following operations, including the processing unit 610 is configured to generate first information, where the first information is used by the terminal device to determine a first receive beam for a downlink signal and/or a first transmit beam for an uplink signal, and the communications unit 620 is configured to send the first information to the terminal device.

Alternatively, the communications apparatus 600 may correspond to the beam indication method 300 provided in this application and the network device in the various embodiments of the beam indication method 300. The units included in the communications apparatus 600 are respectively configured to perform the method 300 and the corresponding operation and/or procedure performed by the network device in the various embodiments of the beam indication method 300.

The processing unit 610 is configured to generate third information, where the third information is used by the terminal device to determine a third receive beam for the downlink signal, the communications unit 620 is configured to send the third information to the terminal device, and the communications unit 620 is further configured to send the downlink signal to the terminal device, where the downlink signal carries fourth information, and the fourth information is used to indicate a third transmit beam for the uplink signal.

Optionally, the communications apparatus 600 may be a chip or an integrated circuit installed in the network device.

Optionally, the processing unit 610 may be a processor, and the communications unit 620 may be a transceiver. The transceiver may include a transmitter and a receiver that together implement a function of the transceiver. Alternatively, the communications unit 620 may be an input/input interface or an input/output circuit.

The network device and the terminal device that are in the foregoing apparatus embodiments completely correspond to the network device and the terminal device that are in the method embodiments, and the corresponding steps of the method are performed by the corresponding units. For example, the communications unit performs the sending and receiving steps in the method embodiment, and other steps except sending and receiving may be performed by the processing unit. The communications unit may also be referred to as a transceiver unit. The transceiver unit includes a sending unit and a receiving unit, and has both sending and receiving functions.

Figure 11:
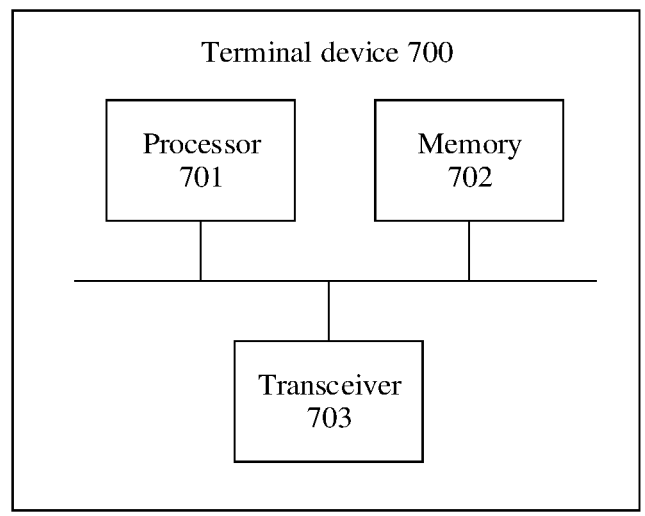
FIG. 11 is a schematic structural diagram of a terminal device 700 according to this application.

FIG. 11 is a schematic structural diagram of a terminal device 700 according to this application. As shown in FIG. 11, the terminal device 700 includes one or more processors 701, one or more memories 702, and one or more transceivers 703. The processor 71 is configured to control the transceiver 703 to receive and send a signal, the memory 702 is configured to store a computer program, and the processor 701 is configured to invoke and run the computer program from the memory 702, to perform the beam indication method 200 or 300 provided in this application and the corresponding procedure and/or operation performed by the terminal device in each embodiment. For brevity, details are not described herein again.

For example, the terminal device 700 may be the terminal device 102 or 103 in the wireless communications system in FIG. 1. For example, the processor 701 may correspond to the processing unit 520 in FIG. 9, and the transceiver 703 may correspond to the communications unit 510 shown in FIG. 9.

Figure 12:
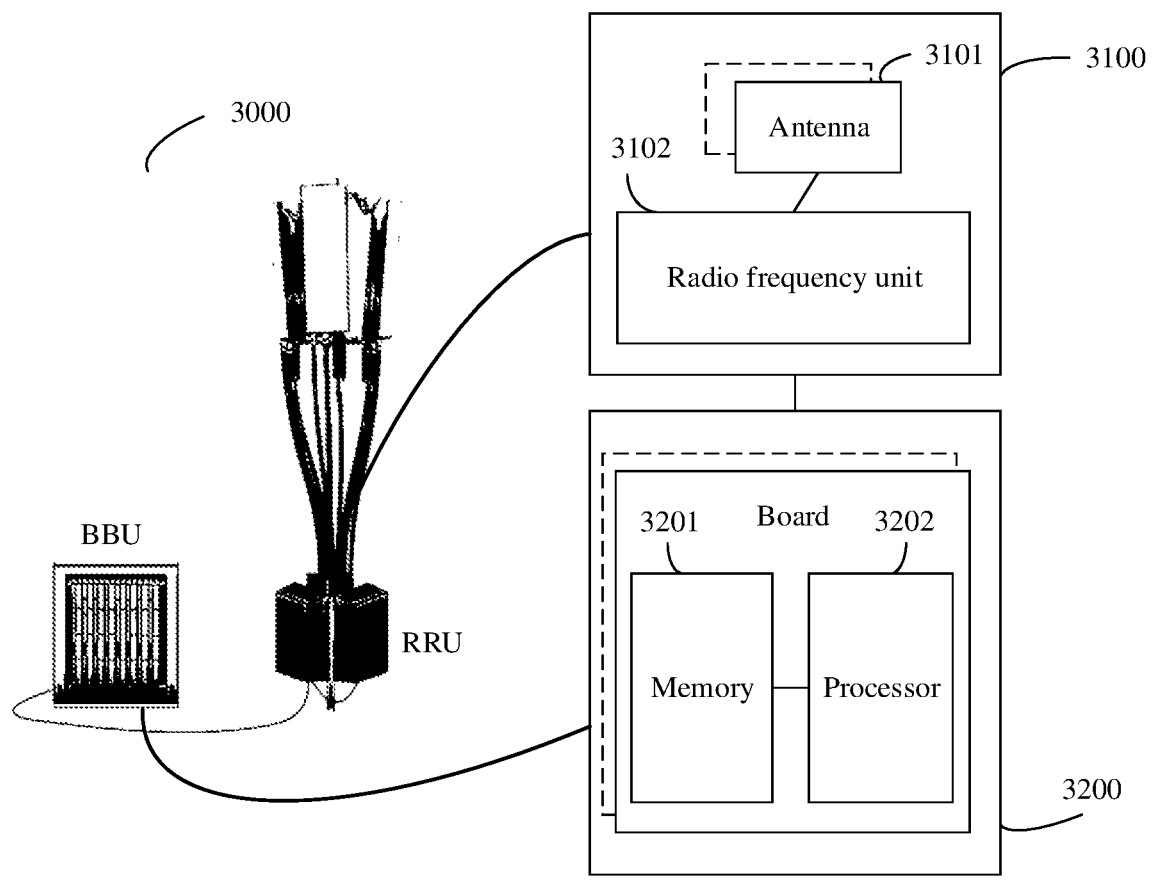
FIG. 12 is a schematic structural diagram of a network device 300 according to this application.

FIG. 12 is a schematic structural diagram of a network device 3000 according to this application. As shown in FIG. 12, the network device 3000 may be applied to the wireless communications system shown in FIG. 1, to perform a function of the network device in the beam indication method embodiment provided in this application. For example, the network device 3000 may be a base station.

The network device 3000 may include one or more radio frequency units, such as a remote radio unit (RRU) 3100 and one or more baseband units (BBU). The baseband unit may also be referred to as a digital unit (DU) 3200. The RRU 3100 may be referred to as a transceiver unit corresponding to the communications unit 620 in FIG. 8. Optionally, the transceiver unit 3100 may also be referred to as a transceiver, a transceiver circuit, or the like, and may include at least one antenna 3101 and a radio frequency unit 3102. Optionally, the transceiver unit 3100 may include a receiving unit and a sending unit, the receiving unit may correspond to a receiver (or referred to as a receiver circuit), and the sending unit may correspond to a transmitter (or referred to as a transmitter circuit). The RRU 3100 part is mainly configured to receive and send a radio frequency signal and perform conversion between a radio frequency signal and a baseband signal, for example, configured to send configuration information of a first random access resource to the terminal device. The BBU 3200 part is mainly configured to perform baseband processing, control a base station, and the like. The RRU 3100 and the BBU 3200 may be physically disposed together or separately, in other words, a distributed base station.

The BBU 3200 is a control center of the network device 3000, or may be referred to as a processing unit, may correspond to the processing unit 610 in FIG. 10, and is mainly configured to complete a baseband processing function, such as channel coding, multiplexing, modulation, or spread spectrum. For example, the BBU (the processing unit) may be configured to control a base station to perform the operation procedure performed by the network device in the foregoing method embodiment. For example, the first information and the second information are generated in the method 200. For another example, the third information and the fourth information are generated in the method 300.

In an example, the BBU 3200 may include one or more boards, and a plurality of boards may together support a radio access network (for example, an LTE network) of a single access standard, or may respectively support radio access networks (such as an LTE network, a 5G network, or another network) of different access standards. The BBU 3200 further includes a memory 3201 and a processor 3202. The memory 3201 is configured to store a necessary instruction and necessary data. The processor 3202 is configured to control the network device 3000 to perform a necessary action. For example, the processor 3202 is configured to control the network device 3000 to perform the operation procedure performed by the network device in the foregoing method embodiment. The memory 3201 and the processor 3202 may serve one or more boards. In other words, a memory and a processor may be disposed on each board, or a plurality of boards share a same memory and processor. In addition, a necessary circuit may further be disposed on each board.

It should be understood that the network device 3000 shown in FIG. 12 can implement the various processes related to the network device in the method embodiments in FIG. 1 to FIG. 8. The operation and/or function of each unit in the network device 3000 are respectively performed to implement the corresponding procedure in the method embodiment. To avoid repetition, detailed descriptions are properly omitted herein.

The BBU 3200 may be configured to perform the action that is described in the foregoing method embodiment and that is internally implemented by the network device, for example, generating the first information. The RRU 3100 may be configured to perform the action that the network device performs sending to or receiving from the terminal device and that is described in the foregoing method embodiment. For example, in the method 200, step 210 of sending the first information to the terminal device, step 230 of sending the downlink signal to the terminal device, step 240 of receiving the uplink signal from the terminal device, and step 250 of sending the second information to the terminal device are performed. For another example, in the method 300, step 310 of sending the first information to the terminal device, step 330 of sending the downlink signal to the terminal device, and step 350 of receiving the uplink signal from the terminal device are performed. For details, refer to the descriptions in the foregoing method embodiment. Details are not described herein again.

In addition, this application provides a computer readable storage medium. A computer instruction is stored in the computer readable storage medium. When the computer instruction is run on a computer, the computer is enabled to perform the corresponding operation and/or procedure performed by the terminal device in the beam indication method 200 or 300 in the embodiment of this application.

This application further provides a computer program product. The computer program product includes computer program code. When the computer program code is run on a computer, the computer is enabled to perform the corresponding operation and/or procedure performed by the terminal device in the beam indication method 200 or 300 in the embodiment of this application.

This application further provides a chip, including a processor. The processor is configured to invoke and run a computer program stored in a memory, to perform the corresponding operation and/or procedure performed by the terminal device in the beam indication method 200 or 300 in the embodiment of this application. Optionally, the chip further includes the memory, the memory is connected to the processor through a circuit or a wire, and the processor is configured to read and execute the computer program in the memory. Further, optionally, the chip further includes a communications interface, and the processor is connected to the communications interface. The communications interface is configured to receive data or information or both needing to be processed. The processor obtains the data or the information or both from the communications interface, and processes the data or the information or both. The communications interface may be an input/output interface.

This application provides a computer readable storage medium. A computer instruction is stored in the computer readable storage medium. When the computer instruction is run on a computer, the computer is enabled to perform the corresponding operation and/or procedure performed by the network device in the beam indication method 200 or 300 in the embodiment of this application.

This application further provides a computer program product, where the computer program product includes computer program code. When the computer program code is run on a computer, the computer is enabled to perform the corresponding operation and/or procedure performed by the network device in the beam indication method 200 or 300 in the embodiment of this application.

This application further provides a chip, including a processor. The processor is configured to invoke and run a computer program stored in a memory, to perform the corresponding operation and/or procedure by the network device in the beam indication method 200 or 300 in the embodiment of this application. Optionally, the chip further includes the memory, the memory is connected to the processor through a circuit or a wire, and the processor is configured to read and execute the computer program in the memory. Further, optionally, the chip further includes a communications interface, and the processor is connected to the communications interface. The communications interface is configured to receive data or information or both needing to be processed. The processor obtains the data or the information or both from the communications interface, and processes the data or the information or both. The communications interface may be an input/output interface.

In the foregoing embodiments, the processor may be a central processing unit (CPU), a micro-processor, an application-specific integrated circuit (ASIC), or one or more integrated circuits for controlling execution of a program in the technical solutions of this application. For example, the processor may be a digital signal processor device, a microprocessor device, an analog-to-digital converter, or a digital-to-analog converter. The processor may distribute control and signal processing functions of the terminal device or the network device among the devices based on respective functions of the devices. In addition, the processor may have a function of operating one or more software programs that may be stored in the memory. The function of the processor may be implemented by hardware or may be implemented by hardware executing corresponding software. The hardware or software includes one or more modules corresponding to the foregoing function.

The memory may be a read-only memory (ROM), another type of static storage device that can store static information and an instruction, a random access memory (RAM), or another type of dynamic storage device that can store information and an instruction, or may be an electrically erasable programmable read-only memory (EEPROM), a compact disc read-only memory (CD-ROM) or another optical disk storage, an optical disc storage (including a compact disc, a laser disc, an optical disc, a digital universal disc, a Blu-ray disc, and the like), a magnetic disk storage medium or another magnetic storage device, or may be any other medium that can be used to carry or store expected program code of an instruction or data structure form and that can be accessed by a computer.

Optionally, the memory and the processor that are in the foregoing embodiment may be units that are physically independent of each other, or the memory may be integrated with the processor.

In this embodiment of this application, "at least one" means one or more, and "plurality" means two or at least two. The term "and/or" describes an association relationship for describing associated objects and represents that three relationships may exist. For example, A and/or B may represent the following three cases: Only A exists, both A and B exist, and only B exists. A and B may be singular or plural. The character "/" generally indicates an "or" relationship between the associated objects. "At least one of the following items" and similar expressions refer to any combination of the items, including a single item or any combination of plural items. For example, at least one of a, b, and c may represent: a, b, c, a-b, a-c, b-c, or a-b-c, where each of a, b, and c may be one or more.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, the disclosed system, apparatus and method may be implemented in other manners. For example, the described apparatus embodiments are merely an example. For example, the module division is merely logical function division and may be other division in actual implementation. For example, a plurality of modules or components may be combined or integrated into another system. For example, a plurality of units or components may be combined or integrated into another system, or some features may be omitted or not implemented. In addition, the displayed or discussed mutual couplings or direct couplings or communication connections may be implemented by using some interfaces. The indirect couplings or communication connections between the apparatuses or units may be implemented in electronic, mechanical, or other forms.

The units as separate parts may not be physically separate, and parts displayed as units may not be physical units, may be located in one position, or may be distributed on a plurality of network units. Some or all of the units may be selected based on actual requirements to achieve the objectives of the technical solutions of this application.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A beam indication method, comprising:
receiving first information from a network device, wherein the first information is used to determine both a first receive beam for a downlink signal and a first transmit beam for an uplink signal, wherein the first information comprises third reference signal configuration information and fourth reference signal configuration information, wherein the third reference signal configuration information indicates an identifier of a third downlink reference signal, and wherein the fourth reference signal configuration information indicates an identifier of a first uplink reference signal; and
determining the first receive beam for the downlink signal and the first transmit beam for the uplink signal based on the first information, wherein the determining the first receive beam and the first transmit beam based on the first information comprises performing at least one of:
determining the third downlink reference signal based on the third reference signal configuration information, and determining the first receive beam based on the third downlink reference signal; or
determining the first uplink reference signal based on the fourth reference signal configuration information, and determining the first transmit beam based on the first uplink reference signal.

2. The method according to claim 1, wherein the method further comprises:
receiving second information from the network device, wherein the second information indicates at least one of a second receive beam for the downlink signal or a second transmit beam for the uplink signal; and
performing at least one of receiving the downlink signal from the network device by using the second receive beam, or sending the uplink signal to the network device by using the second transmit beam.

3. The method according to claim 1, wherein the first information indicates the first receive beam for the downlink signal; and
wherein the method further comprises determining the first transmit beam for the uplink signal based on a signal in the downlink signal.

4. A communications apparatus, comprising:
a transceiver;
a processor; and
a non-transitory computer readable medium having stored thereon a program for execution by the processor, the program including instructions to:
receive, through the transceiver, first information from a network device, wherein the first information is used to determine both a first receive beam for a downlink signal and a first transmit beam for an uplink signal, wherein the first information comprises third reference signal configuration information and fourth reference signal configuration information, wherein the third reference signal configuration information indicates an identifier of a third downlink reference signal, and wherein the fourth reference signal configuration information indicates an identifier of a first uplink reference signal; and
determine the first receive beam for the downlink signal and the first transmit beam for the uplink signal based on the first information received by the transceiver, wherein the instructions to determine the first receive beam for the downlink signal and the first transmit beam for the uplink signal include instructions to perform at least one of:
determine the third downlink reference signal based on the third reference signal configuration information, and determine the first receive beam based on the third downlink reference signal; or
determine the first uplink reference signal based on the fourth reference signal configuration information, and determine the first transmit beam based on the first uplink reference signal.

5. The communications apparatus according to claim 4, wherein the program further includes instructions to:
   receive, through the transceiver, second information from the network device, wherein the second information indicates at least one of a second receive beam for the downlink signal or a second transmit beam for the uplink signal; and
   perform at least one of receive, through the transceiver, from the network device, the downlink signal using the second receive beam, or send, through the transceiver, to the network device, the uplink signal using the second transmit beam.

6. The communications apparatus according to claim 4, wherein the first information indicates the first receive beam for the downlink signal; and
   wherein the program further includes instructions to determine the first transmit beam for the uplink signal based on a signal in the downlink signal.

\* \* \* \* \*